United States Patent
Sugai et al.

(10) Patent No.: US 11,582,078 B2
(45) Date of Patent: Feb. 14, 2023

(54) WIRELESS COMMUNICATION APPARATUS AND WIRELESS COMMUNICATION METHOD

(71) Applicant: SONY CORPORATION, Tokyo (JP)

(72) Inventors: Ren Sugai, Tokyo (JP); Yusuke Tanaka, Tokyo (JP); Shigeru Sugaya, Tokyo (JP)

(73) Assignee: SONY CORPORATION, Tokyo (JP)

(*) Notice: Subject to any disclaimer, the term of this patent is extended or adjusted under 35 U.S.C. 154(b) by 7 days.

(21) Appl. No.: 17/048,903

(22) PCT Filed: Apr. 12, 2019

(86) PCT No.: PCT/JP2019/015901
§ 371 (c)(1),
(2) Date: Oct. 19, 2020

(87) PCT Pub. No.: WO2019/208255
PCT Pub. Date: Oct. 31, 2019

(65) Prior Publication Data
US 2021/0168004 A1    Jun. 3, 2021

(30) Foreign Application Priority Data
Apr. 27, 2018 (JP) .............................. JP2018-086251

(51) Int. Cl.
*H04L 27/26* (2006.01)
*H04W 52/18* (2009.01)
*H04W 16/10* (2009.01)

(52) U.S. Cl.
CPC ......... *H04L 27/2602* (2013.01); *H04W 16/10* (2013.01); *H04W 52/18* (2013.01)

(58) Field of Classification Search
CPC .. H04L 5/0044; H04L 27/2602; H04W 16/02; H04W 72/04; H04W 72/0453
See application file for complete search history.

(56) References Cited

U.S. PATENT DOCUMENTS 7,929,409 B2    4/2011  Chitrapu et al.
2005/0180315 A1   8/2005  Chitrapu et al.
(Continued)

FOREIGN PATENT DOCUMENTS

CN    1265542 A    9/2000
CN    108432173 A   8/2018
(Continued)

OTHER PUBLICATIONS

Extended European Search Report of EP Application No. 19791920.2, dated Apr. 16, 2021, 07 pages.
(Continued)

*Primary Examiner* — Aristocratis Fotakis
(74) *Attorney, Agent, or Firm* — Chip Law Group

(57) ABSTRACT

The present technology relates to a wireless communication apparatus and a wireless communication method that make it possible to read necessary information even in a case where a physical header at a top portion of a signal transmitted from a base station of another BSS fails to be received and the signal is received from the middle. The wireless communication apparatus includes a communication section configured to generate and transmit an OFDM signal in which second information is superimposed in a frequency axis direction of the OFDM signal which includes first information destined for one or more subordinate client devices. The present technology can be applied to a wireless communication apparatus and so forth that perform wireless communication, for example, standardized by IEEE 802.11.

18 Claims, 19 Drawing Sheets

(56) References Cited

U.S. PATENT DOCUMENTS

| | | | |
|---|---|---|---|
| 2005/0195769 A1 | 9/2005 | Kaewell et al. | |
| 2005/0232156 A1* | 10/2005 | Kim | H04L 5/0046 370/236 |
| 2006/0268674 A1 | 11/2006 | Sudo | |
| 2010/0189162 A1 | 7/2010 | Yoshimoto et al. | |
| 2012/0030541 A1* | 2/2012 | Okamura | H03M 13/353 714/758 |
| 2013/0077467 A1* | 3/2013 | No | H04L 27/265 370/210 |
| 2014/0044040 A1* | 2/2014 | Chen | H04J 11/005 370/328 |
| 2015/0029966 A1* | 1/2015 | Park | H04L 5/0053 370/329 |
| 2015/0043520 A1* | 2/2015 | Sun | H04L 5/005 370/330 |
| 2015/0263876 A1* | 9/2015 | Chung | H04L 25/03343 370/208 |
| 2017/0181129 A1 | 6/2017 | Bharadwaj et al. | |
| 2017/0331645 A1* | 11/2017 | Baligh | H04L 27/2613 |
| 2019/0059012 A1* | 2/2019 | Nam | H04W 24/08 |
| 2021/0144696 A1* | 5/2021 | Cariou | H04W 52/0229 |

FOREIGN PATENT DOCUMENTS

| | | |
|---|---|---|
| EP | 1973257 A1 | 9/2008 |
| EP | 2068480 A1 | 6/2009 |
| EP | 3395002 A1 | 10/2018 |
| JP | 11-145928 A | 5/1999 |
| JP | 11-215092 A | 8/1999 |
| JP | 11-298439 A | 10/1999 |
| JP | 2001-144722 A | 5/2001 |
| JP | 2013-098807 A | 5/2013 |
| JP | 2019-506040 A | 2/2019 |
| KR | 10-2000-0062675 A | 10/2000 |
| KR | 10-2018-0097555 A | 8/2018 |
| TW | I262694 B | 9/2006 |
| TW | 200635261 A | 10/2006 |
| TW | I305092 B | 1/2009 |
| TW | 200943788 A | 10/2009 |
| TW | 200945850 A | 11/2009 |
| TW | I381697 B | 1/2013 |
| WO | 2005/067538 A2 | 7/2005 |
| WO | 2005/069836 A2 | 8/2005 |
| WO | 2008/029845 A1 | 3/2008 |
| WO | 2017/112818 A1 | 6/2017 |

OTHER PUBLICATIONS

Banawan, et al., "Hybrid Phase Shift Keying-Multipulse Pulse-Position Modulated O-OFDM signals for NG-PONs", International conference on transparent optical networks (ICTON), IEEE, XP033147791, Jul. 2-6, 2017, 04 pages.

International Search Report and Written Opinion of PCT Application No. PCT/JP2019/015901, dated Jun. 11, 2019, 09 pages of ISRWO.

Lv, et al., "Proposed Resolution to CID 12194", IEEE 802.11-16/0226r0, Jan. 15, 2018, 10 pages.

* cited by examiner

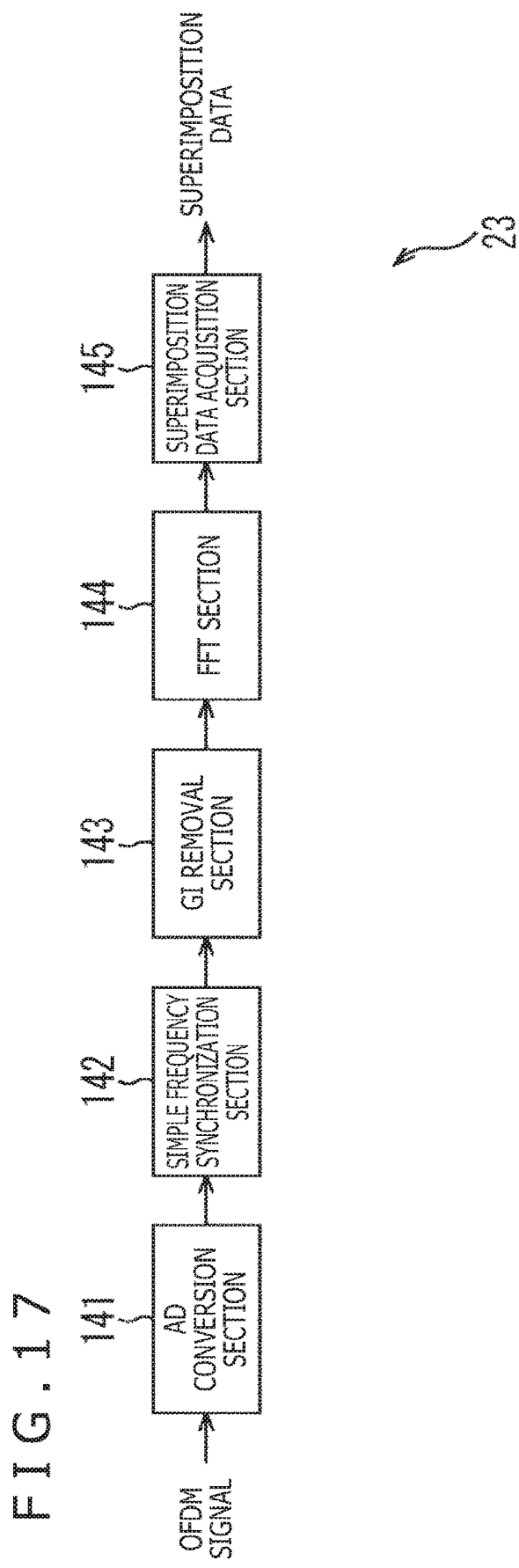

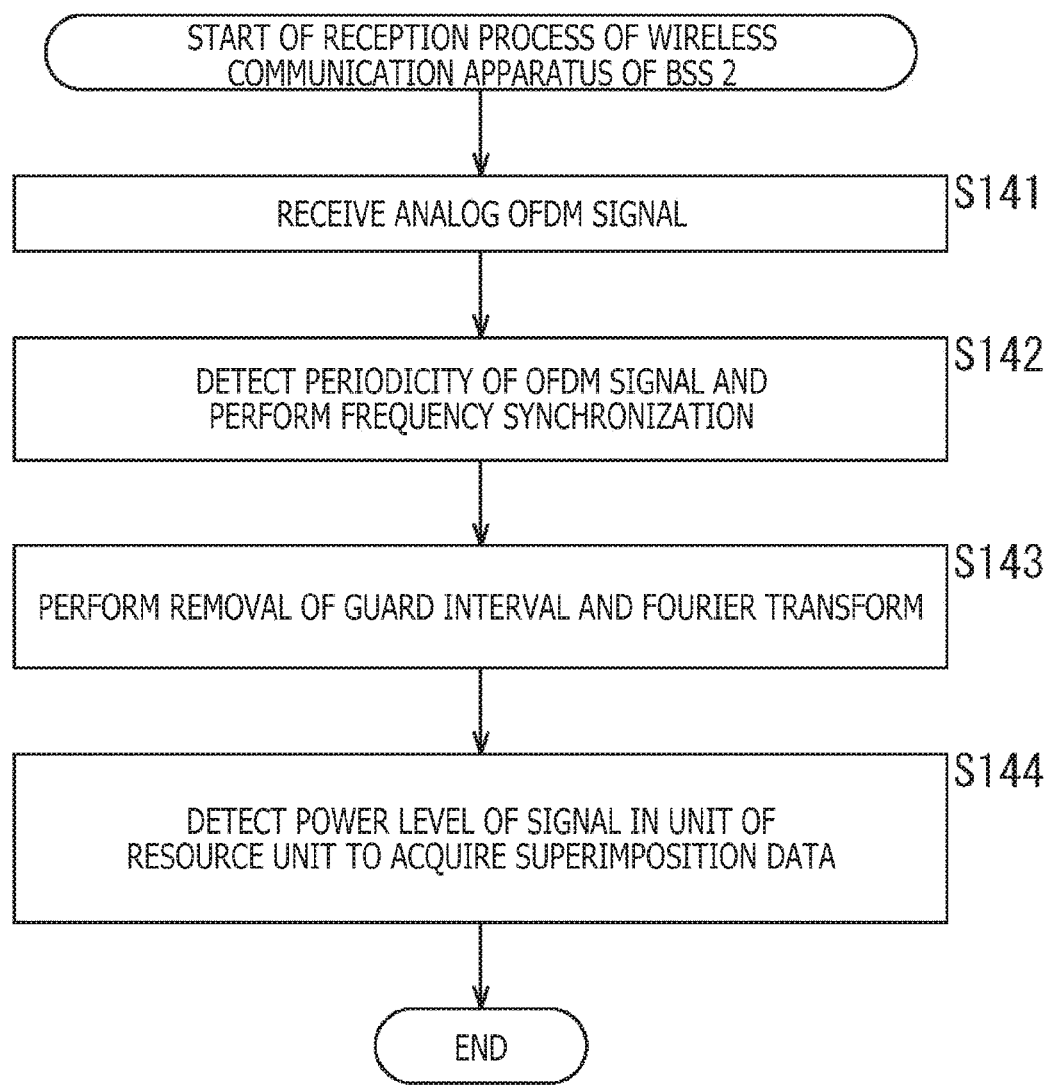

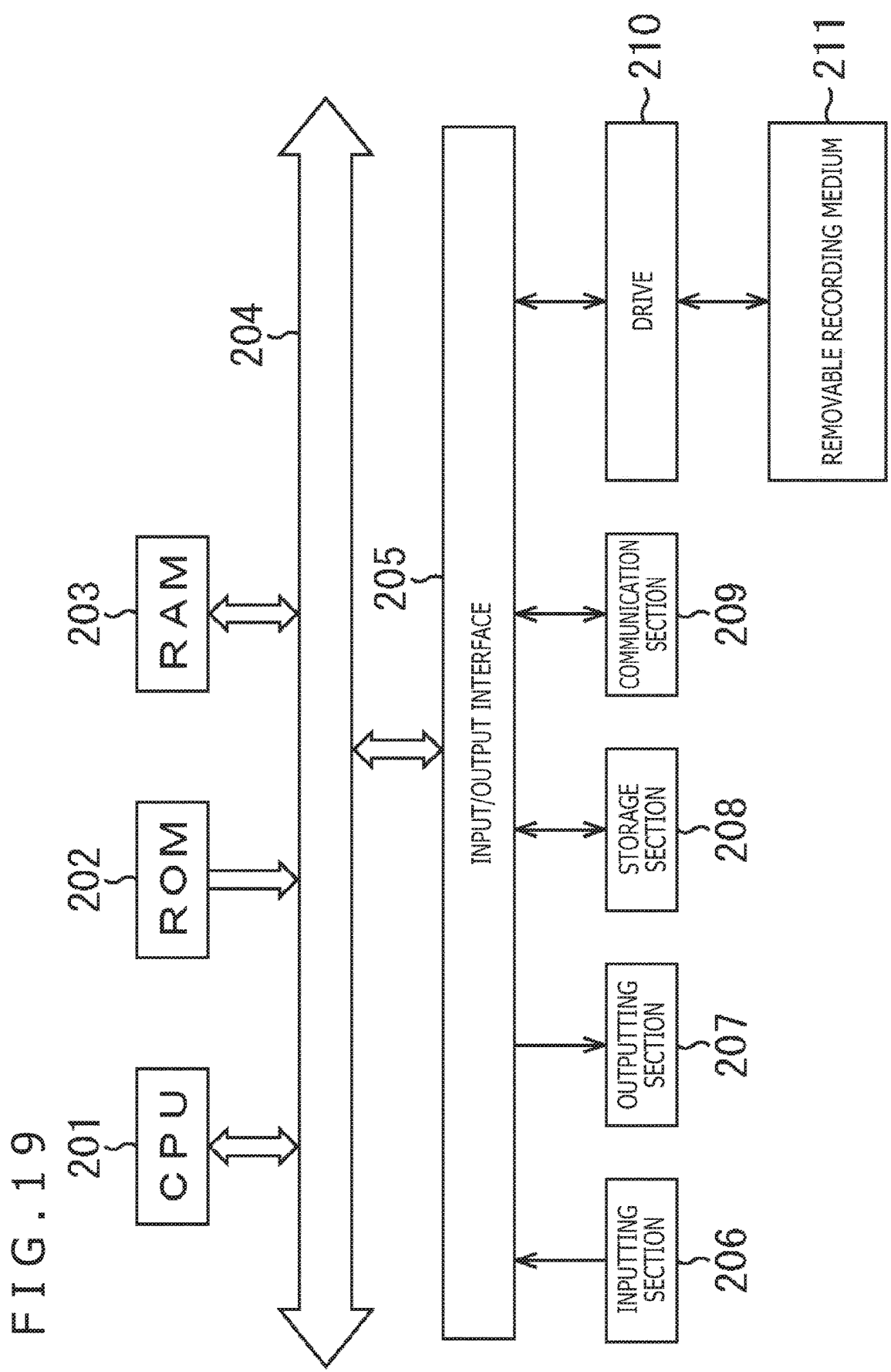

WIRELESS COMMUNICATION APPARATUS AND WIRELESS COMMUNICATION METHOD

CROSS REFERENCE TO RELATED APPLICATIONS

This application is a U.S. National Phase of International Patent Application No. PCT/JP2019/015901 filed on Apr. 12, 2019, which claims priority benefit of Japanese Patent Application No. JP 2018-086251 filed in the Japan Patent Office on Apr. 27, 2018. Each of the above-referenced applications is hereby incorporated herein by reference in its entirety.

TECHNICAL FIELD

The present technology relates to a wireless communication apparatus and a wireless communication method, and particularly to a wireless communication apparatus and a wireless communication method that make it possible to read necessary information even in a case where a physical header at a top portion of a signal transmitted from a base station of another BSS fails to be received and the signal is received from the middle.

BACKGROUND ART

In a wireless LAN, a base station (Access Point) and one or more client devices (Station) that are to be connected to and communicate with the base station form a network called Basic Service Set (hereinafter referred to as BSS), and communication is started in a decentralized autonomous manner in a unit of a BSS to perform wireless communication.

However, in recent years, the installation density of base stations per a unit area increases to cause an environment in which the distance between BSSs is short (dense environment), and the problem that the communication speed decreases by interference originating from an adjacent BSS has been becoming serious. In order to solve this problem, a technology has appeared which aims at improvement of the communication efficiency of an entire network by performing control so as not to give interference while necessary information is exchanged between BSSs different from each other and performing communication at the same time.

For example, PTL 1 discloses a method for reducing interference between BSSs by performing information exchange between the BSSs. Information exchanged between the BSSs is included in a physical header at a top portion of a signal transmitted from a base station of another BSS.

CITATION LIST

Patent Literature

[PTL 1]
Japanese Patent Laid-Open No. 2013-98807

SUMMARY

Technical Problem

However, in a dense environment, such a situation occurs that the physical header at a top portion of a signal transmitted from a base station of another BSS fails to be received. As a result, the method according to PTL 1 may fail to function sufficiently, in some cases.

The present technology has been made in view of such a situation as described above and makes it possible to read necessary information even in a case where a physical header at a top portion of a signal transmitted from a base station of another BSS fails to be received and the signal is received from the middle.

Solution to Problem

A wireless communication apparatus according to a first aspect of the present technology includes a communication section configured to generate and transmit an OFDM signal in which second information is superimposed in a frequency axis direction of the OFDM signal which includes first information destined for one or more subordinate client devices.

A wireless communication method according to the first aspect of the present technology is performed by a wireless communication apparatus and includes generating and transmitting an OFDM signal in which second information is superimposed in a frequency axis direction of the OFDM signal which includes first information destined for one or more subordinate client devices.

In the first aspect of the present technology, an OFDM signal in which second information is superimposed in a frequency axis direction of the OFDM signal which includes first information destined for one or more subordinate client devices is generated and transmitted.

A wireless communication apparatus according to a second aspect of the present technology includes a communication section configured to receive an OFDM signal which is transmitted from a base station to which the own apparatus is connected and in which second information is superimposed in a frequency axis direction of the OFDM signal which includes first information destined for the own apparatus to acquire the first information.

A wireless communication method according to the second aspect of the present technology is performed by a wireless communication apparatus and includes receiving an OFDM signal which is transmitted from a base station to which the own apparatus is connected and in which second information is superimposed in a frequency axis direction of the OFDM signal which includes first information destined for the own apparatus to acquire the first information.

In the second aspect of the present technology, an OFDM signal which is transmitted from a base station to which the own apparatus is connected and in which second information is superimposed in a frequency axis direction of the OFDM signal which includes first information destined for the own apparatus is received, and the first information is acquired.

A wireless communication apparatus according to a third aspect of the present technology includes a communication section configured to receive an OFDM signal which is transmitted from a base station of a BSS different from that of the own apparatus and in which second information is superimposed in a frequency axis direction of the OFDM signal which includes first information to acquire the second information.

A wireless communication method according to the third aspect of the present technology is performed by a wireless communication apparatus and includes receiving an OFDM signal which is transmitted from a base station of a BSS different from that of the own apparatus and in which second information is superimposed in a frequency axis direction of the OFDM signal which includes first information to acquire the second information.

In the third aspect of the present technology, an OFDM signal which is transmitted from a base station of a BSS different from that of the own apparatus and in which second information is superimposed in a frequency axis direction of the OFDM signal which includes first information is received, and the second information is acquired.

It is to be noted that the wireless communication apparatus according to the first to third aspects of the present technology can be implemented by causing a computer to execute a program.

Further, the program to be executed by a computer in order to implement the wireless communication apparatus according to the first to third aspects of the present technology can be provided by being transmitted through a transmission medium or by being recorded on a recording medium.

The wireless communication apparatus may be an independent apparatus or an internal block configuring one apparatus.

Advantageous Effects of Invention

According to the first aspect of the present technology, even in a case where a physical header at a top portion of an OFDM signal fails to be received and the signal is received from the middle, second information can be made to be received.

According to the second aspect of the present technology, even in a case where a physical header at a top portion of an OFDM signal fails to be received and the signal is received from the middle, first information can be acquired using the OFDM signal that allows reading of second information.

According to the third aspect of the present technology, even in a case where a physical header at a top portion of an OFDM signal fails to be received and the signal is received from the middle, second information can be read.

It is to be noted that the effects described here are not necessarily restrictive and may be any effect described in the present disclosure.

BRIEF DESCRIPTION OF DRAWINGS

FIG. 17 is a block diagram depicting an example of a configuration of part of the communication section of a wireless communication apparatus of another BSS.

FIG. 18 is a flow chart illustrating a reception process in the wireless communication apparatus of another BSS.

FIG. 19 is a block diagram depicting an example of a configuration of an embodiment of a computer to which the present technology is applied.

DESCRIPTION OF EMBODIMENT

In the following, a mode for carrying out the present technology (hereinafter referred to as an embodiment) is described. It is to be noted that the description is given in the following order.
1. Example of Configuration of Wireless Communication System
2. Problem in Dense Environment
3. Example of Configuration in Case Where OFDM Signal Is Transmitted to Single Destination
4. Flow Chart of Transmission Process of Transmitting OFDM Signal to Single Destination
5. Example of Configuration in Case Where OFDM Signal Is Transmitted to Plural Destinations
6. Flow Chart of Transmission Process of Transmitting OFDM Signal to Plural Destinations
7. Example of Configuration in Case Where OFDM Signal of Single Destination Is Received
8. Example of Configuration in Case Where OFDM Signal of Plural Destinations Is Received
9. Flow Chart of Reception Process of Receiving OFDM Signal of Plural Destinations
10. Example of Configuration of Wireless Communication Apparatus of Another BSS
11. Flow Chart of Reception Process in Wireless Communication Apparatus of Another BSS
12. Example of Configuration of Computer <1. Example of Configuration of Wireless Communication System>

Figure 1:
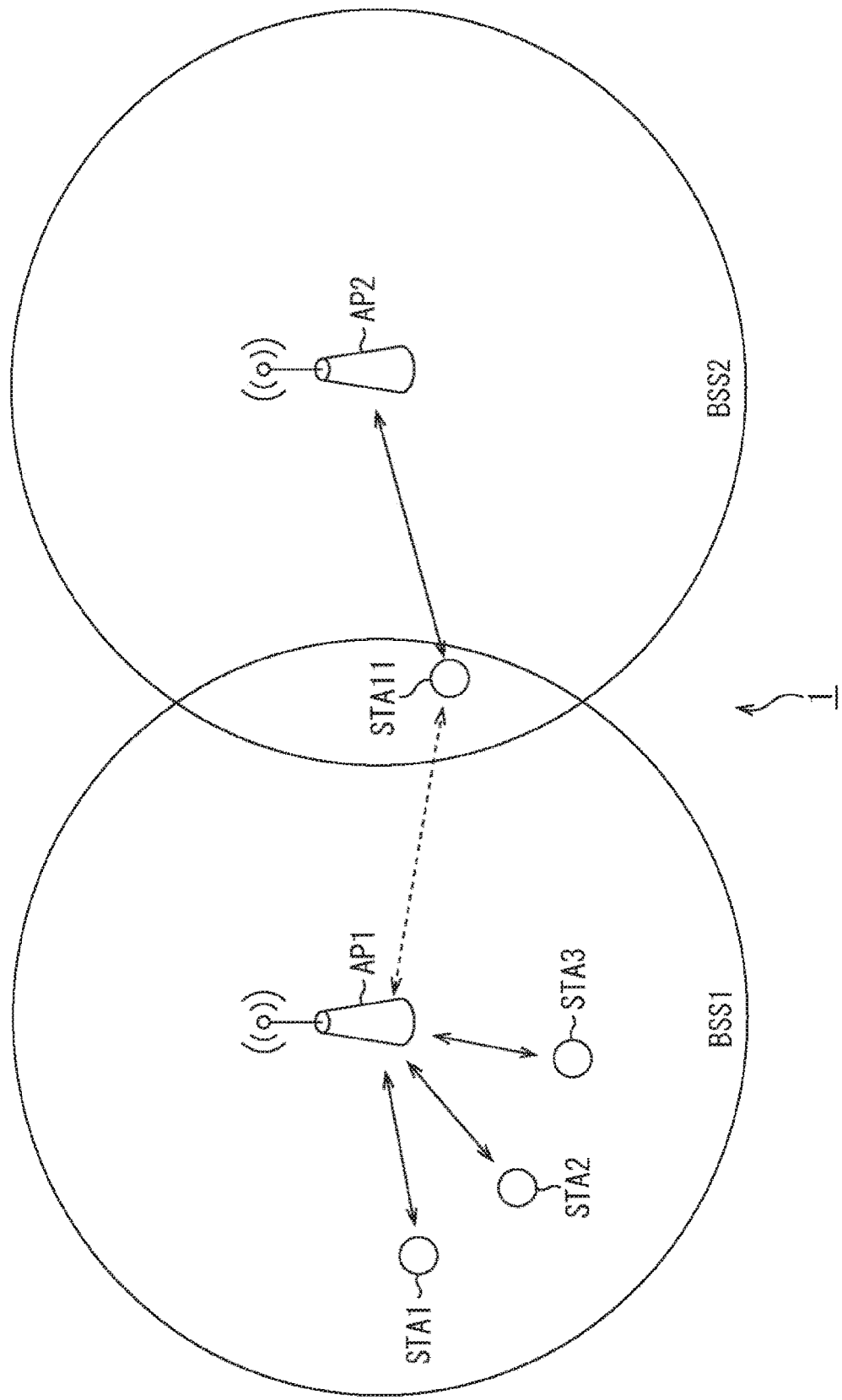
FIG. 1 is a view depicting an example of a configuration of a wireless communication system that is an embodiment to which the present technology is applied.

FIG. 1 depicts an example of a configuration of a wireless communication system that is an embodiment to which the present technology is applied.

A wireless communication system 1 of FIG. 1 configures a wireless LAN (Local Area Network) standardized, for example, in IEEE (Institute of Electrical and Electronic Engineers) 802.11 and includes a plurality of BSSs (Basic Service Set), and includes a plurality of base stations AP (Access Point) and client devices STA (Station) that are connected to the corresponding base station AP. In particular, the wireless communication system 1 includes base stations AP1 and AP2 and client devices STA1 to STA3 and STA11, and the client devices STA1 to STA3 are client devices STA that are connected to the base station AP1 while the client device STA11 is a client device STA connected to the base station AP2. The base station AP1 and the client devices STA1 to STA3 are included in a BSS 1, and the base station AP2 and the client device STA11 are included in a BSS 2. The client devices STA1 to STA3 perform wireless communication with the base station AP1, and the client device STA11 performs wireless communication with the base station AP2. The BSS 1 and the BSS 2 have a positional relation of mutual interference therebetween, and a solid line arrow mark in FIG. 1 represents communication while a broken line arrow mark indicates interference.

It is to be noted that the number of BSSs configuring the wireless communication system 1 depicted in FIG. 1, the number of base stations AP, and the number of client devices STA that are connected to and perform communication with each base station AP are freely selected and are not limited to those depicted in FIG. 1.

Figure 2:
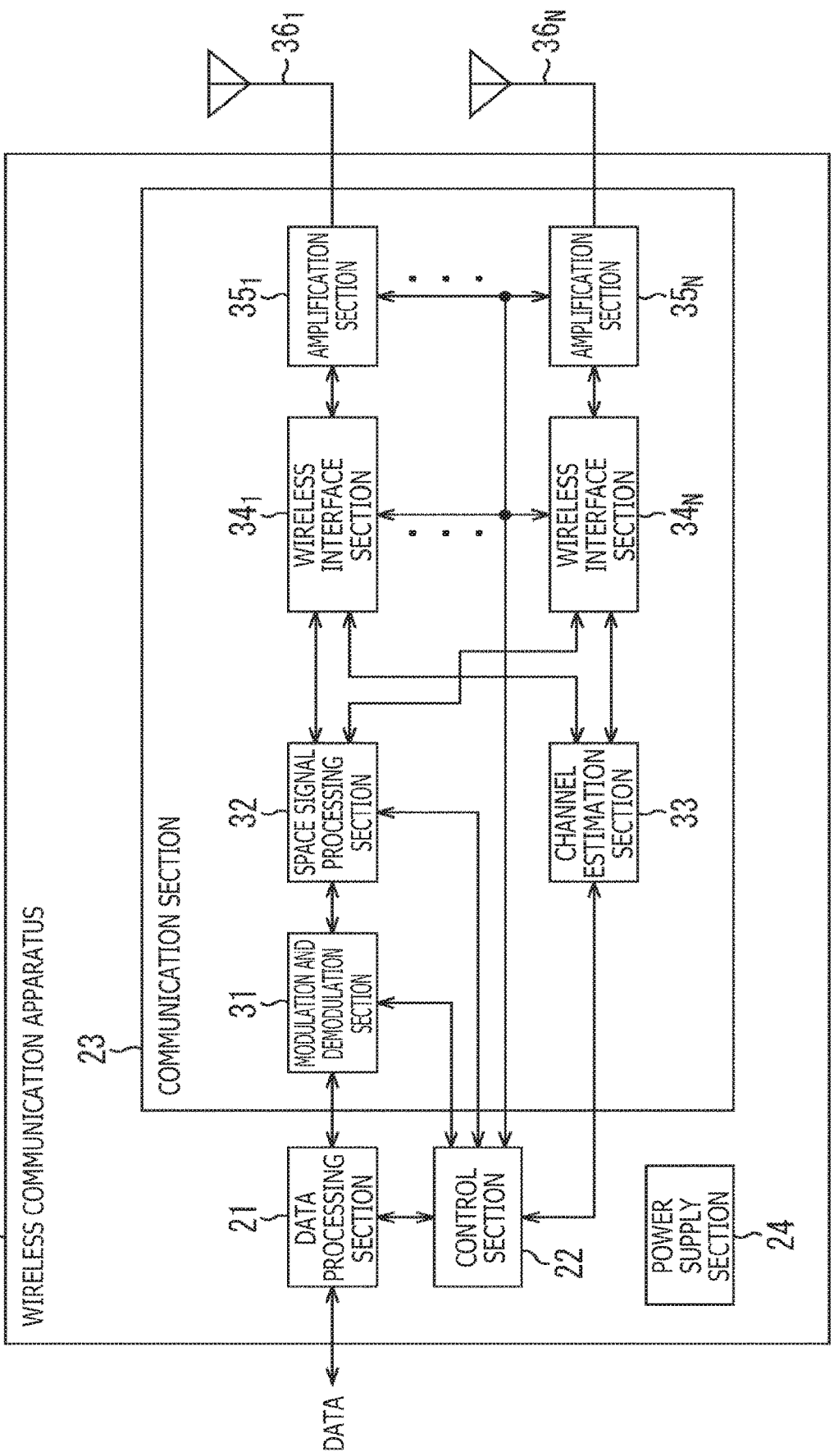
FIG. 2 is a block diagram depicting an example of a configuration of a wireless communication apparatus that operates as a base station AP or a client device STA of FIG. 1.

FIG. 2 is a block diagram depicting an example of a configuration of a wireless communication apparatus that operates as the base station AP or the client device STA of FIG. 1.

The wireless communication apparatus 10 in FIG. 2 includes a data processing section 21, a control section 22, a communication section 23, and a power supply section 24. The communication section 23 includes a modulation and demodulation section 31, a space signal processing section 32, a channel estimation section 33, a wireless interface section $34_i$, an amplification section $35_i$, and an antenna $36_i$ (i=1, 2, . . . , N). The wireless interface section $34_i$, the amplification section $35_i$, and the antenna $36_i$ may be configured as one set or two or more sets. In particular, N of the subscript i=1, 2, . . . , N indicates a positive number equal to or greater than 1. In a case where there is no necessity to specifically distinguish the wireless interface sections $34_i$, the amplification sections $35_i$, and the antennas $36_i$, each of them is referred to also as a wireless interface section 34, an amplification section 35, and an antenna 36, respectively. It is to be noted that one set of the wireless interface section $34_i$, the amplification section $35_i$, and the antenna $36_i$ may be configured as one processing section. The communication section 23 is implemented, for example, by an LSI (Large Scale Integration).

At the time of data transmission for transmitting data, the data processing section 21 performs various data processes such as a process of generating a packet for wireless transmission for data inputted from an upper layer and adding an MAC header that is a header for media access control (MAC) and a process of adding an error detection code, and supplies data (packet) after the processes to the modulation and demodulation section 31.

Further, at the time of data reception for receiving data, the data processing section 21 performs data processes such as analysis of an MAC header, error detection of a packet, and a reorder process and supplies data after the processes to an upper layer.

The control section 22 totally controls operation of the entire wireless communication apparatus 10. For example, parameter setting in the modulation and demodulation section 31, the space signal processing section 32, the wireless interface section 34, the amplification section 35, and so forth, scheduling of packets in the data processing section 21, and so forth are performed. More particularly, for example, the control section 22 performs a process of determining an encoding method and a modulation method for data and setting the determined result to the modulation and demodulation section 31.

The modulation and demodulation section 31 performs, at the time of data transmission, encoding and modulation for the data inputted from the data processing section 21 on the basis of the encoding method and the modulation method set by the control section 22 to thereby generate a data symbol stream and supplies the generated data symbol stream to the space signal processing section 32.

Further, the modulation and demodulation section 31 performs, at the time of data reception, processes (decoding and demodulation) reverse to those upon data transmission for inputted data from the space signal processing section 32, and supplies data obtained as a result of the processes to the data processing section 21 or the control section 22.

The space signal processing section 32 performs, at the time of data transmission, signal processing adapted to space separation for the inputted data from the modulation and demodulation section 31 as occasion demands, and supplies one or more obtained transmission symbol streams to the wireless interface sections $34_1$ to $34_N$.

Further, the space signal processing section 32 performs, at the time of data reception, signal processing of the reception symbol streams inputted from the wireless interface sections $34_1$ to $34_N$ and performs spatial decomposition of the streams as occasion demands and then supplies a result of the process to the modulation and demodulation section 31.

The channel estimation section 33 calculates complex channel gain information of a propagation path from the preamble part and the training signal part from within the input signals from the wireless interface sections $34_1$ and $34_N$. The calculated complex channel gain information is utilized in a demodulation process by the modulation and demodulation section 31 and a space process by the space signal processing section 32 through the control section 22.

The wireless interface section $34_i$ converts, at the time of data transmission, the input data from the space signal processing section 32 into an analog signal and performs filtering and upconvert into a carrier frequency and then supplies a resulting signal to the amplification section $35_i$.

Also, the wireless interface section $34_i$ performs, at the time of data reception, a process reverse to that upon data transmission for the input from the amplification section $35_i$ and supplies data to the space signal processing section 32 and the channel estimation section 33.

The amplification section $35_i$ amplifies, at the time of data transmission, the analog signal inputted from the wireless interface section $34_i$ to predetermined power and supplies a resulting analog signal to the antenna $36_i$. The antenna $36_i$ transmits the analog signal supplied from the amplification section $35_i$ as an electromagnetic wave.

Also, the amplification section $35_i$ amplifies, at the time of data reception, the analog signal supplied from the antenna $36_i$ to predetermined power and supplies a resulting analog signal to the wireless interface section $34_i$. The antenna $36_i$ receives a transmission signal transmitted as an electromagnetic wave from another wireless communication apparatus 10 and supplies the received signal as a reception signal to the amplification section $35_i$.

The amplification section $35_i$ can include at least one of the function upon data transmission or the function upon data reception in the wireless interface section $34_i$. Further, in a case where both of the function upon data transmission and the function upon data reception are included in the wireless interface section $34_i$, the communication section 23 is configured without the amplification section $35_i$.

The power supply section 24 includes a battery power supply or a fixed power supply and supplies power to the components in the wireless communication apparatus 10.

The wireless communication apparatus 10 that operates as a base station AP or a client device STA of FIG. 1 is configured in such a manner as described above.

<2. Problem in Dense Environment>

The base station AP or the client device STA in a predetermined BSS starts communication in a decentralized autonomous manner to perform wireless communication.

However, in recent years, the installation density of base stations AP per a unit area has increased until an environment (dense environment) in which the distance between BSSs is short appears, and such a problem has become serious that the communication speed decreases due to interference arriving from an adjacent BSS. In order to solve the problem, a technology has appeared which tries to improve the communication efficiency of an entire network by controlling such that, while necessary information is exchanged between different BSSs, no interference is caused between the BSSs to perform communication simultaneously.

In IEEE 802.11ax that is a wireless LAN standard being currently established, a space reuse (Spatial Reuse: SR) technology is examined which makes it possible for an own apparatus to perform communication even in a case where a signal by communication of another BSS is detected. In the SR technology, in a case where it is decided, using information for performing spatial reuse (hereinafter referred to as SR information) that is included in a physical header at a top portion of a signal transmitted from a wireless communication apparatus of another BSS, that the transmission signal is a signal sent from a wireless communication apparatus of another BSS, it is possible to control the transmission power so as to suppress interference to the other BSS thereby to get a transmission opportunity. As the SR information, for example, a BSS identifier, information relating to transmission power, or the like is available.

Figure 3:
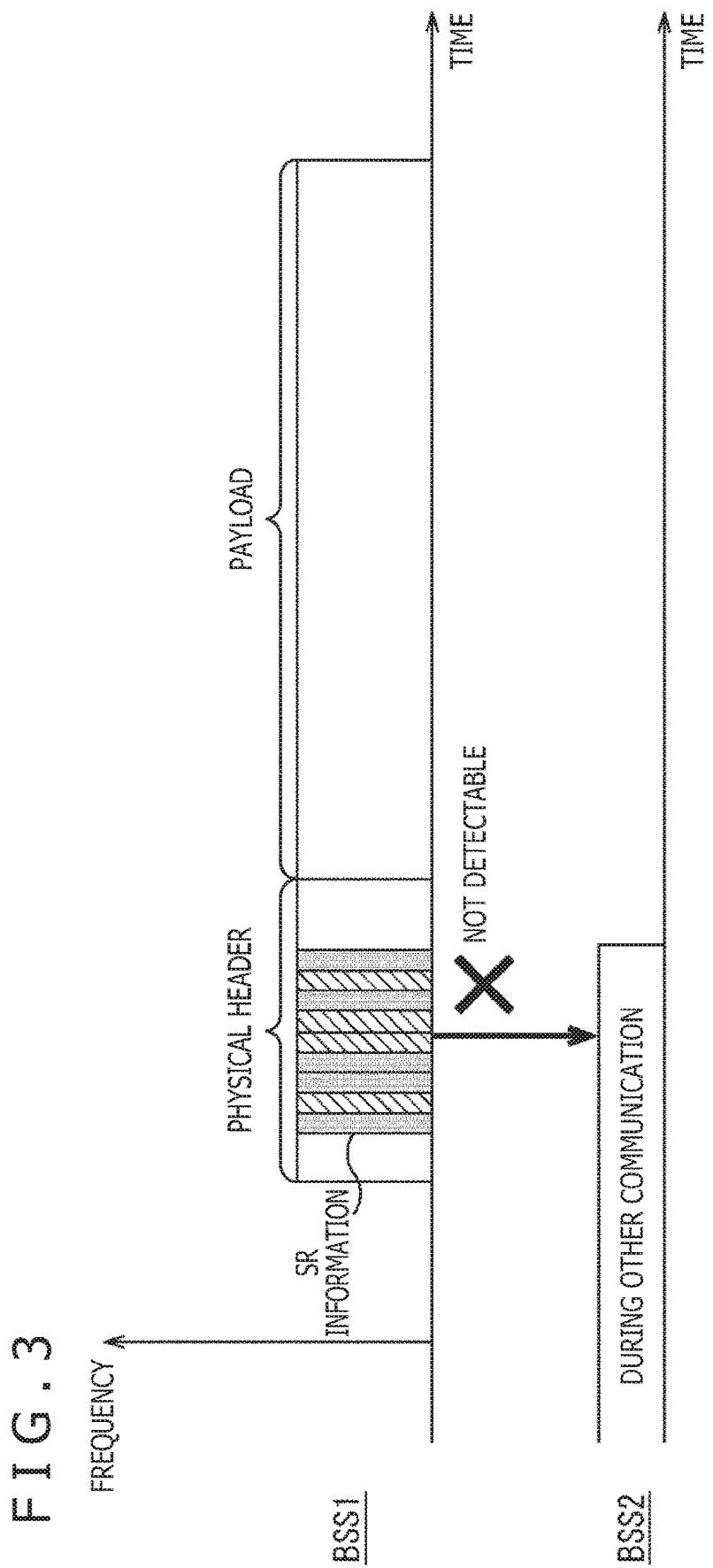
FIG. 3 is a view illustrating a problem in a dense environment.

However, especially in a dense environment, since the number of base stations AP per a unit area is great, as depicted in FIG. 3, such a situation possibly occurs that a top of a signal cannot be received from the reason that another signal is being received, resulting in reception failure of SR information included in the physical header of the top of a packet.

An upper part of FIG. 3 indicates a manner in which the base station AP1 of the BSS 1 transmits an OFDM (Orthogonal Frequency Division Multiplexing) signal. The axis of abscissa represents time, and the axis of ordinate represents the frequency. A frame of an OFDM signal includes a physical header and a payload, and SR information is included in the physical header.

A lower part of FIG. 3 indicates operation of the wireless communication apparatus 10 of the BSS 2 different from that of the BSS 1 of the base station AP1. The axis of abscissa represents time. Since the base station AP2 or the client device STA11 of the BSS 2 different from the BSS 1 of the base station AP1 is, for example, in a state in which reception cannot be performed because it is communicating with another base station or in low-power consumption state, a portion including the physical header of the OFDM signal transmitted from the base station AP1 cannot be received. In this case, SR information necessary to perform control so as not to give interference to perform simultaneous communication cannot be acquired, and effective communication cannot be executed.

Figure 4:
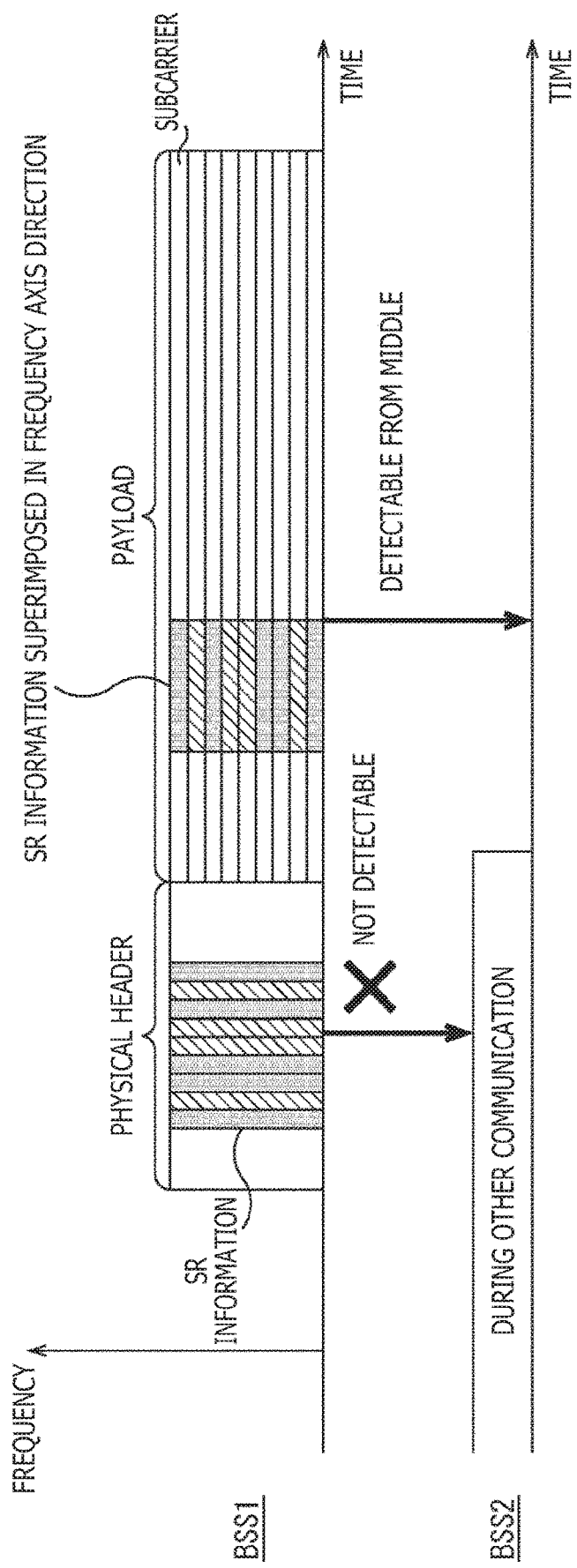
FIG. 4 is a view illustrating operation implemented by the wireless communication system of FIG. 1.

Therefore, in the wireless communication system 1, for example, the base station AP1 generates and transmits an OFDM signal in which SR information is superimposed in a frequency axial direction of a payload as depicted in FIG. 4. Consequently, even in a case where the base station AP2 and the client device STA11 of the BSS 2 different from the BSS 1 of the base station AP1 fails to receive the SR information of the physical header at the top of the OFDM signal from the base station AP1 and receives the OFDM signal from the middle, the base station AP2 and the client device STA11 of the BSS 2 can read the SR information, and accordingly, it is possible to control the transmission power so as to suppress interference to another BSS (BSS 1) thereby to perform spatial reuse for transmitting predetermined information.

In the following description, an example is described in which, as in an example of FIG. 4, the base station AP1 of the BSS 1 outputs a transmission signal in which second information is superimposed in a frequency axial direction of an OFDM signal including first information destined for the subordinate client devices STA and then the base station AP2 and the client device STA11 of the BSS 2 different from the BSS 1 acquire the second information superimposed in the frequency axial direction from the transmission signal from the base station AP1. The SR information described above is an example of the second information, and the first information is information that is acquired by the client device STA that is a destination of the transmission signal from among a plurality client devices STA subordinate to the base station AP1.

It is to be noted that, in IEEE 802.11ax that is a wireless LAN standard being currently established, in a case where the base station AP1 on the transmission side transmits an OFDM signal including the first information, not only that a single subordinate client device STA is determined as a transmission destination but also OFDMA (Orthogonal Frequency Division Multiple Access) in which a plurality of client devices STA is determined as transmission destinations simultaneously is also examined.

Therefore, in the following description, an OFDM signal in which the second information is superimposed in a frequency axial direction of the OFDM signal including the first information is described in regard to both of a case in which a single client device STA is made a transmission destination and another case in which a plurality of client devices STA is made a transmission destination.

<3. Example of Configuration in Case where OFDM Signal is Transmitted to Single Destination>

Figure 5:
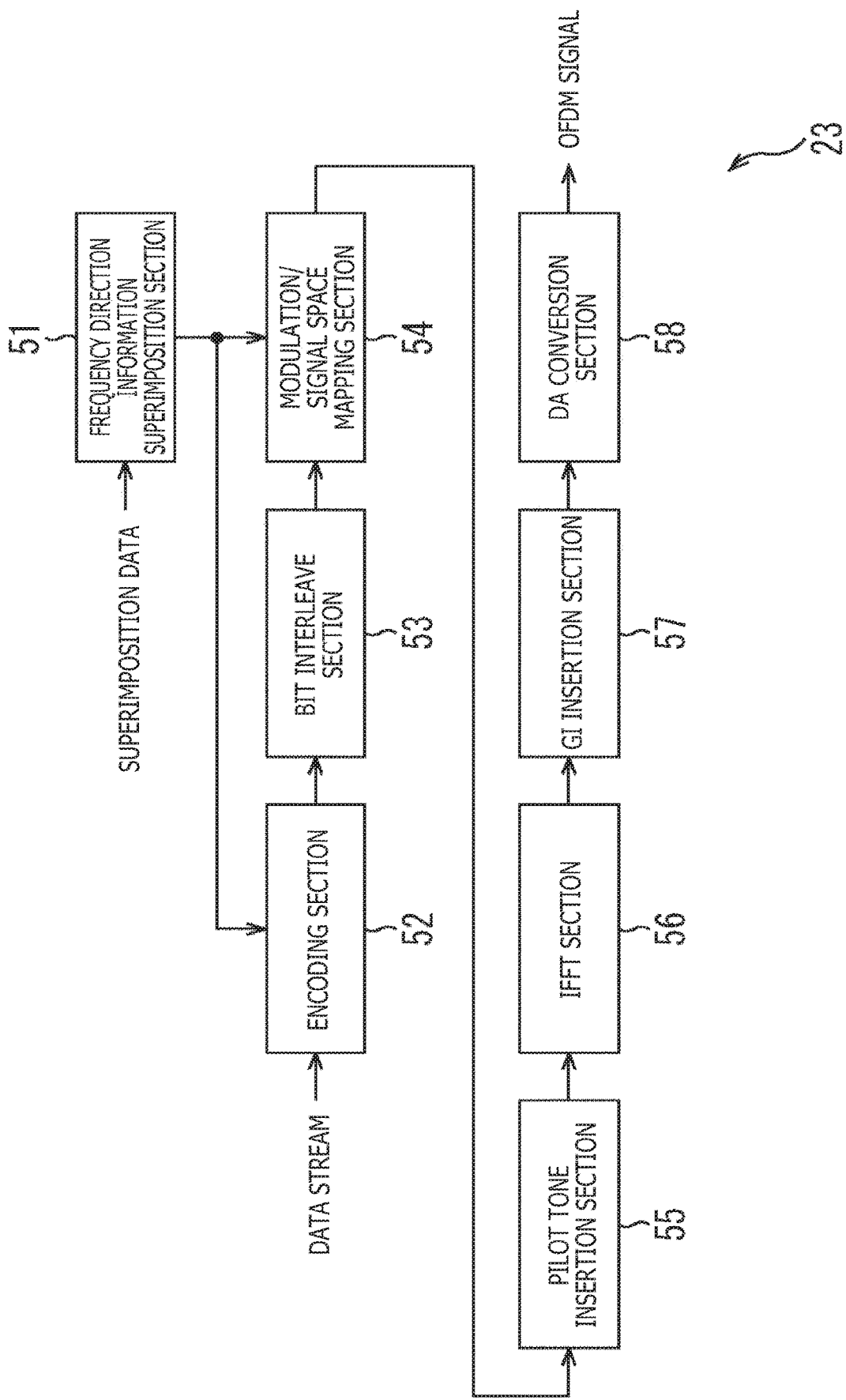
FIG. 5 is a block diagram depicting an example of a configuration of part of a communication section in a case where an OFDM signal is transmitted to a single destination.

FIG. 5 is a block diagram depicting an example of a configuration of part of the communication section 23 in a case where the wireless communication apparatus 10 is the base station AP1 that transmits an OFDM signal in which second information is superimposed in a frequency axial direction and an OFDM signal is generated and transmitted with a single client device STA set as a destination.

The communication section 23 includes a frequency direction information superimposition section 51, an encoding section 52, a bit interleave section 53, a modulation/ signal space mapping section 54, a pilot tone insertion section 55, an IFFT section 56, a GI insertion section 57 and a DA conversion section 58.

The configuration of FIG. 5 corresponds to the modulation and demodulation section 31, the space signal processing section 32, and the wireless interface section 34 of the communication section 23 in FIG. 2. It is to be noted that the configuration of FIG. 5 is an example and is not restrictive if equivalent functions can be implemented.

The second information is binarized and inputted as superimposition data from the control section 22 (FIG. 2) to the frequency direction information superimposition section 51. The frequency direction information superimposition section 51 determines a method for modulating and superimposing the inputted superimposition data in response to a power level component in a subcarrier direction of an OFDM signal. In particular, the frequency direction information superimposition section 51 performs determination of first and second power levels that are power levels corresponding to binary values, a subcarrier number configuring a resource unit RU, and first and second MCSs (Modulation and Coding Scheme) to be used for subcarriers for which the first and second power levels are respectively used. The resource unit RU is a unit of subcarriers for setting the first and second power levels. In the present embodiment, it is assumed that the first power level is higher than the second power level for the convenience of description. It is to be noted that the second information may be multi-valued information, and in this case, the number of power levels and MCSs corresponding to the multi-value are determined.

Figure 6:
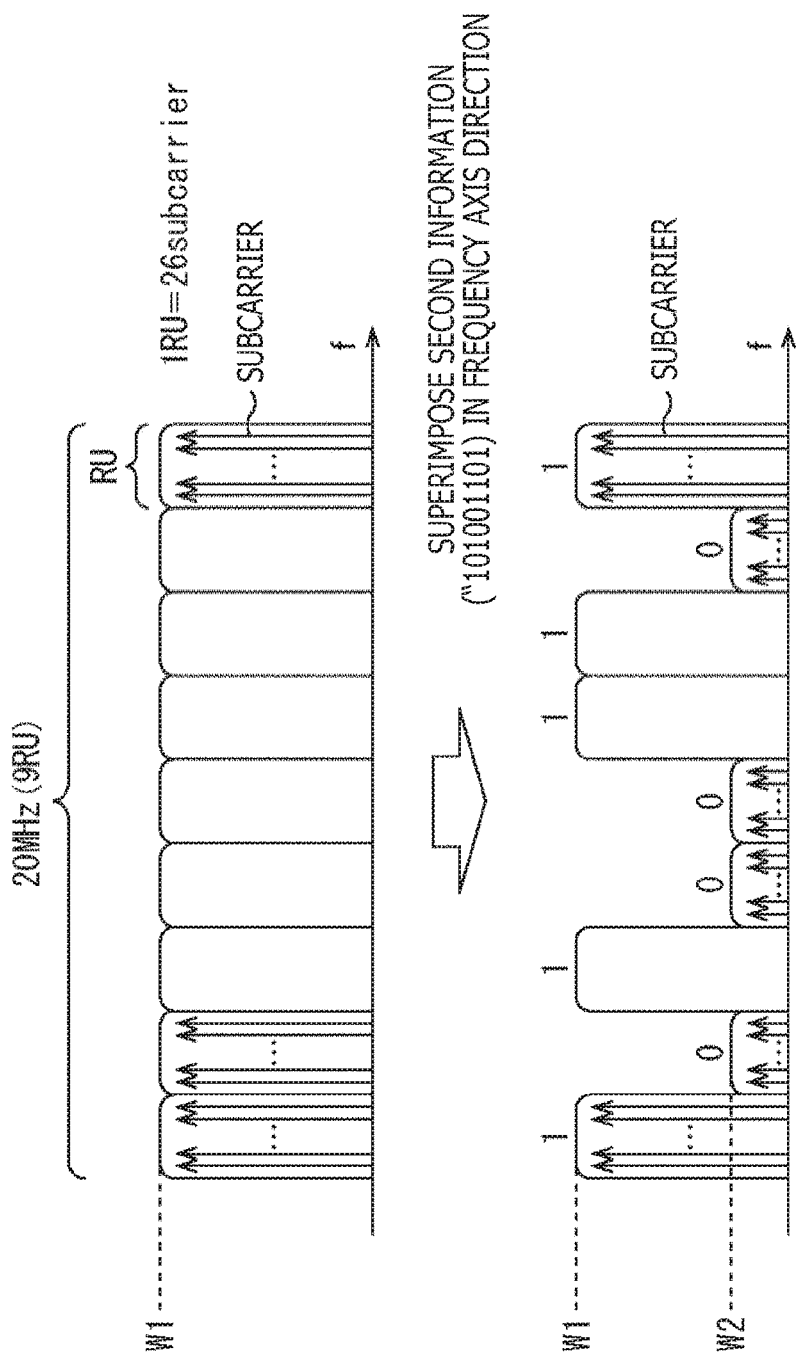
FIG. 6 is a view depicting an example of a signal in which second information is superimposed in a frequency axial direction.

FIG. 6 depicts an example of a signal in which second information is superimposed in a frequency axis direction according to a parameter determined by the frequency direction information superimposition section 51.

FIG. 6 depicts an example of a signal in which binary information of "101001101" as the second information is superimposed in a frequency axis direction. In FIG. 6, the axis of abscissa represents the frequency, and the axis of ordinate represents the power level. Further, in FIG. 6, an arrow mark in the vertical direction represents a subcarrier.

In FIG. 6, It is on an assumption that the channel bandwidth is 20 MHz, the frequency band of 20 MHz is divided into 256 subcarriers, and among the subcarriers, the number of subcarriers for transmitting data (data subcarriers) is 234.

The frequency direction information superimposition section 51 determines a first power level W1 and a second power level W2. The first power level W1 and the second power level W2 are set so as to have a power difference therebetween such that the base station AP2 and the STA 11 of the BSS 2 that is another BSS can identify the first power level W1 and the second power level W2. The first power level W1 may be same as or as a matter of course, may be different from the first power level W1 that is used by the base station AP1 of the BSS 1 in ordinary transmission that is depicted in an upper part of FIG. 6 and with which second information is not superimposed.

Further, in a case where information of 9 bits of "101001101" is superimposed as the second information, the frequency direction information superimposition section 51 determines 26 subcarriers obtained by dividing the 234 subcarriers into nine as a resource unit RU. Since the resource unit RU is a setting unit for the first and second power levels, in other words, the frequency direction information superimposition section 51 determines the subcarrier number of a setting unit for the first and second power levels as 26. The subcarrier number configuring a resource unit RU is not limited to a plural number but may be one. It is sufficient if the subcarrier number configuring a resource unit RU is a value necessary for the base station AP2 and the STA 11 of the BSS 2 different from the BSS 1 of the base station AP1 that is a transmission source to identify the power difference between the first power level W1 and the second power level W2.

Further, the frequency direction information superimposition section 51 determines a first MCS to be used for each subcarrier for which the first power level is used, and a second MCS to be used for each subcarrier for which the second power level is used. The first MCS may be determined from a signal to noise ratio expected for the client device STA of the BSS 1 that is the destination of the transmission signal and may be same as an MCS that is used by the base station AP1 in ordinary transmission in which second information is not superimposed. The second MCS can be an MCS equivalent to a bit error rate (Bit Error Rate: BER) on the reception side when the first MCS is used for transmission with the first power level. For example, in a case where the first MCS is set to 64 QAM at the encoding ratio of 5/6 and besides the BER is equal to or lower than a predetermined measurement limit value (almost 0), if it is assumed that the power difference between the first and second power levels is determined to be, for example, 6 dB, then the second MCS can be set to 16 QAM at the encoding ratio of 3/4.

Referring back to FIG. 5, the frequency direction information superimposition section 51 supplies the determined first and second power levels, subcarrier number configuring a resource unit RU, and first and second MCSs to the encoding section 52 and the modulation/signal space mapping section 54 together with the superimposition data.

To the encoding section 52, a data stream in which the first information is packetized and for which such processes as addition of an MAC header including an identifier of a client device STA that becomes a destination, addition of an error detection code, padding and so forth have been performed is inputted from the data processing section 21 (FIG. 2).

The encoding section 52 encodes the inputted data stream by a predetermined encoding method such as, for example, convolution encoding or LDPC (Low Density Parity Check) encoding on the basis of the first and second MCSs supplied from the frequency direction information superimposition section 51 and supplies an encoded bit stream obtained as a result of the encoding to the bit interleave section 53.

The bit interleave section 53 interleaves the encoded bit stream from the encoding section 52 such that bit errors are decreased and supplies the interleaved encoded bit stream to the modulation/signal space mapping section 54.

The modulation/signal space mapping section 54 modulates the encoded bit stream after interleaved by modulation methods of the first and second MCSs supplied from the frequency direction information superimposition section 51 and supplies modulated encoded bit stream to the pilot tone insertion section 55.

It is to be noted that at least some of the encoding section 52 to the modulation/signal space mapping section 54 may be provided in plural number for each section, and they may each be executed in parallel. For example, such a configuration that they may each be executed in parallel can be applied; for example, the number of components according to the bit number of superimposition data are provided; or the number of components equal to the number of subcarriers by which data is transmitted are provided.

The pilot tone insertion section 55 inserts a subcarrier for transmitting a pilot tone into and adds a physical header to each subcarrier for transmitting data and supplies a resulting signal to the IFFT section 56.

The IFFT section 56 inverse Fourier transforms the subcarriers supplied from the pilot tone insertion section 55 and supplies a signal obtained by the inverse Fourier transform to the GI insertion section 57.

The GI insertion section 57 inserts a guide interval into the signal inputted from the IFFT section 56 and supplies a resulting signal to the DA conversion section 58. The DA conversion section 58 converts a digital signal supplied from the GI insertion section 57 into an analog signal and supplies an OFDM signal obtained as a result of the conversion to the amplification section 35 (FIG. 2).

The configuration described above makes it possible for the base station AP1 of the BSS 1 to generate a transmission signal in which second information is superimposed in the frequency axis direction in an OFDM signal including first information destined for subordinate client devices STA and transmit the transmission signal.

Figure 7:
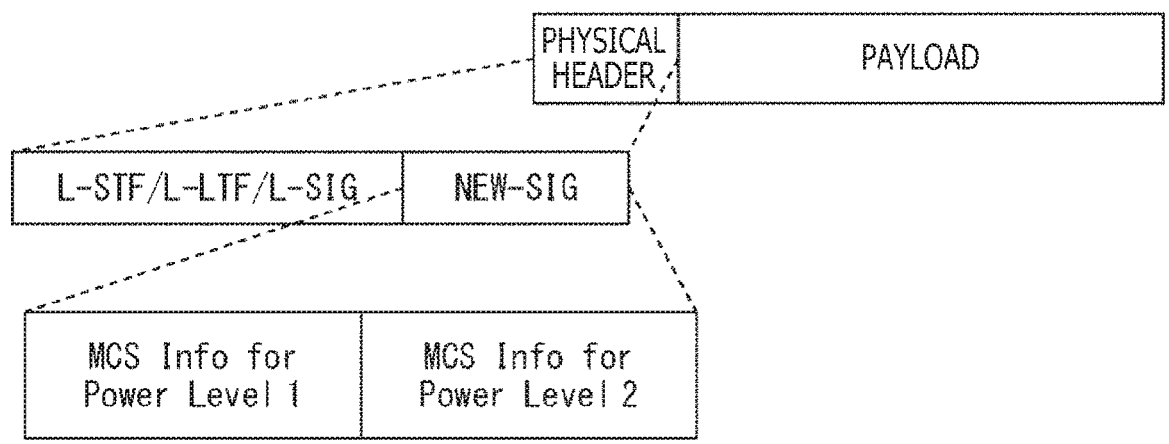
FIG. 7 is a view depicting a frame format of an OFDM signal to be transmitted to a single destination.

FIG. 7 depicts a frame format of an OFDM signal transmitted from the base station AP1 of the BSS 1.

The frame includes a physical header placed at the top thereof and a payload following the physical header. Since the CRC is added to the tail end of the physical header, before the wireless communication apparatus 10 on the reception side receives an entire frame, it can confirm the details of the frame only from the physical header.

The physical header has an L-STF (Legacy Short Training Field), an L-LTF (Legacy Long Training Field) and an L-SIG (Legacy Signal field). Further, The L-SIG of the physical header is followed by a NEW-SIG that is a region for storing information necessary to receive the present frame correctly by the wireless communication apparatus 10 on the reception side. In the NEW-SIG, an MCS Info for Power Level 1 field and an MCS Info for Power Level 2 field are placed, and information relating to a modulation encoding method for a subcarrier is stored. In the MCS Info for Power Level 1 field, a first MCS is stored. In the MCS Info for Power Level 2 field, a second MCS is stored.

Since the frame of FIG. 7 is an example in a case where the second information is binary information, two MCS Info for Power Level fields are provided in the NEW-SIG. However, in a case where the second information is multi-valued information, the number of MCS Info for Power Level fields corresponding to the number of values of the second information are provided in the NEW-SIG. From the information stored in the NEW-SIG, the client device STA that is a destination of the OFDM signal can find MCSs to be used for signals of different power levels and becomes possible to perform demodulation and decoding correctly.

The payload has, for example, Frame Control, Duration, RA, TA, FCS, and so forth. In the Frame Control, information relating to setting of this frame and so forth are included. In the Duration, information relating to the length of this frame is included. In the RA, information relating to a destination of this frame is included. In the TA, information relating to a transmission source of this frame is included. In the FCS, information for error detection of the frame is included.

<4. Flow Chart of Transmission Process of Transmitting OFDM Signal to Single Destination>

Figure 8:
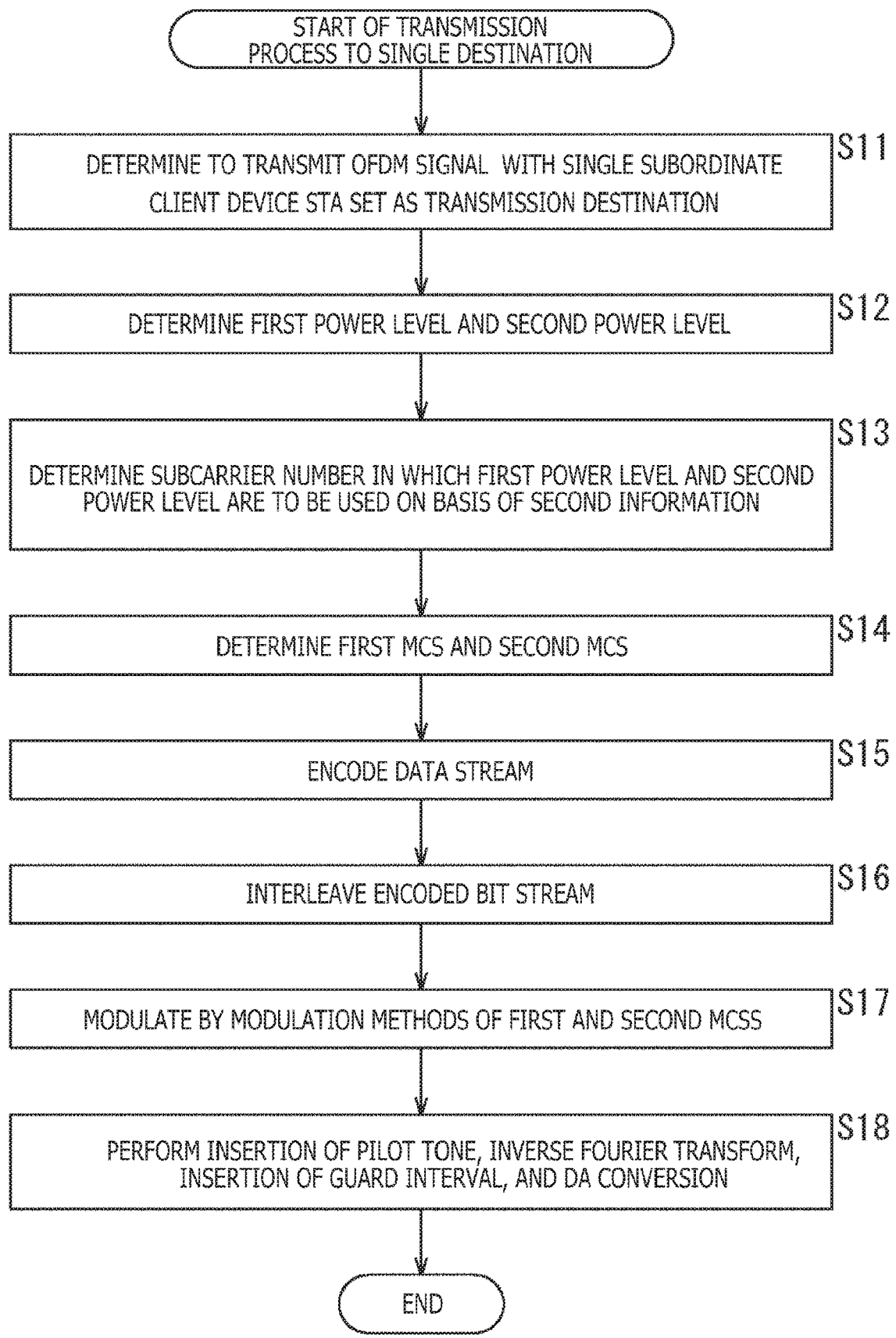
FIG. 8 is a flow chart illustrating a transmission process of transmitting an OFDM signal to a single destination.

FIG. 8 is a flow chart illustrating a transmission process in a case where the wireless communication apparatus 10 as the base station AP1 of the BSS 1 transmits an OFDM signal in which second information is superimposed in a frequency axis direction to a single destination.

First in step S11, the control section 22 determines to transmit an OFDM signal with a single subordinate client device STA set as a transmission destination, and determines and supplies second information to be used as superimposition data to the frequency direction information superimposition section 51. Further, a data stream in which first information to be transmitted to the client device STA of the transmission destination is packetized and to which a MAC header including an identifier of the client device STA of the destination, an error detection code, and so forth are added is inputted from the data processing section 21 (FIG. 2) to the encoding section 52.

In step S12, the frequency direction information superimposition section 51 determines a first power level and a second power level. The first power level and the second power level are set so as to have a power difference therebetween such that the base station AP2 and the STA 11 of the BSS 2 that is another BSS can identify the first power level and the second power level.

In step S13, the frequency direction information superimposition section 51 determines a subcarrier number with which the first power level and the second power level are used on the basis of the second information superimposed in the frequency axis direction. In other words, the frequency direction information superimposition section 51 determines a subcarrier number of a resource unit RU that is a setting unit for the first and second power levels.

In step S14, the frequency direction information superimposition section 51 determines a first MCS to be used for each of the subcarriers for which the first power level is to be used and a second MCS to be used for each of the subcarriers for which the second power level is to be used. Then, the frequency direction information superimposition section 51 supplies the determined first and second power levels, the subcarrier number that is a setting unit for the first and second power levels, and the first and second MCSs to the encoding section 52 and the modulation/signal space mapping section 54 together with the superimposition data.

In step S15, the encoding section 52 encodes a data stream inputted from the data processing section 21 by convolution coding, LDPC coding, or the like on the basis of the first and second MCSs supplied from the frequency direction information superimposition section 51, and supplies an encoded bit stream obtained as a result of the encoding to the bit interleave section 53.

In step S16, the bit interleave section 53 interleaves the encoded bit stream from the encoding section 52 and supplies the interleaved encoded bit stream to the modulation/signal space mapping section 54.

In step S17, the modulation/signal space mapping section 54 modulates the encoded bit stream after interleaved by the modulation methods of the first and second MCSs supplied from the frequency direction information superimposition section 51 and supplies the modulated interleaved encoded bit stream to the pilot tone insertion section 55.

In step S18, insertion of a pilot tone, inverse Fourier transform, insertion of a guard interval, and DA conversion are performed in order, and as a result, an OFDM signal is generated to be outputted to the amplification section 35 (FIG. 2).

Specifically, in step S18, the pilot tone insertion section 55 inserts a subcarrier for transmitting a pilot tone into and adds a physical header to the subcarriers that transmit data, and supplies a resulting signal to the IFFT section 56. The IFFT section 56 inverse Fourier transforms the subcarriers supplied from the pilot tone insertion section 55 and supplies a resulting signal to the GI insertion section 57. The GI insertion section 57 inserts a guide interval into the signal supplied from the IFFT section 56 and supplies a resulting signal to the DA conversion section 58. The DA conversion section 58 converts the digital signal supplied from the GI insertion section 57 into an analog signal and supplies an OFDM signal obtained as a result of the conversion to the amplification section 35 (FIG. 2). The OFDM signal supplied to the amplification section 35 is amplified and then sent out as an electromagnetic wave from the antenna 36.

The transmission process in a case where an OFDM signal in which second information is superimposed in the frequency axis direction is transmitted to a single destination is executed in such a manner as described above.

<5. Example of Configuration in Case where OFDM Signal is Transmitted to Plural Destinations>

Now, a case in which an OFDMA in which a plurality of client devices STA is set as a transmission destination to be simultaneously transmitted is executed is described.

The control section 22 determines whether or not an OFDMA is to be executed, in other words, whether a single client device STA is to be determined as a transmission destination or a plurality of client devices STA is to be determined as a transmission destination on the basis of a data amount destined for the subordinate client devices STA, a request from a subordinate client device STA, or the like.

In a case where the OFDMA is to be executed, the control section 22 determines (generates) second information that is superimposition data to be superimposed in the frequency axis direction and determines a plurality of client devices STA to which the first information is to be transmitted and resource allocation. The plurality of client devices STA to which the first information is to be transmitted is determined depending upon the data amount destined for the subordinate client devices STA, a request from a subordinate client device STA, or the like. The determination of resource allocation represents a determination to which client device STA as a destination each resource unit RU is to be allocated in such a way that the channel bandwidth corresponds to a size of the second information.

For example, similarly as in the example of the single destination, if it is assumed that the channel bandwidth is 20 MHz and the channel bandwidth of 20 MHz is divided into nine resource units RU, then the control section 22 determines to which client device STA each of the nine resource units RU is to be allocated.

For example, it is assumed that six client devices STA1 to STA6 corresponding to users 1 to 6 exist in the BSS 1 and the control section 22 of the base station AP1 allocates, determining all of the six client devices STA1 to STA6 as a destination, the nine resource units RU in the order of one, two, three, one, one, and one to the client devices STA1 to STA6 of the users 1 to 6, respectively.

Figure 9:
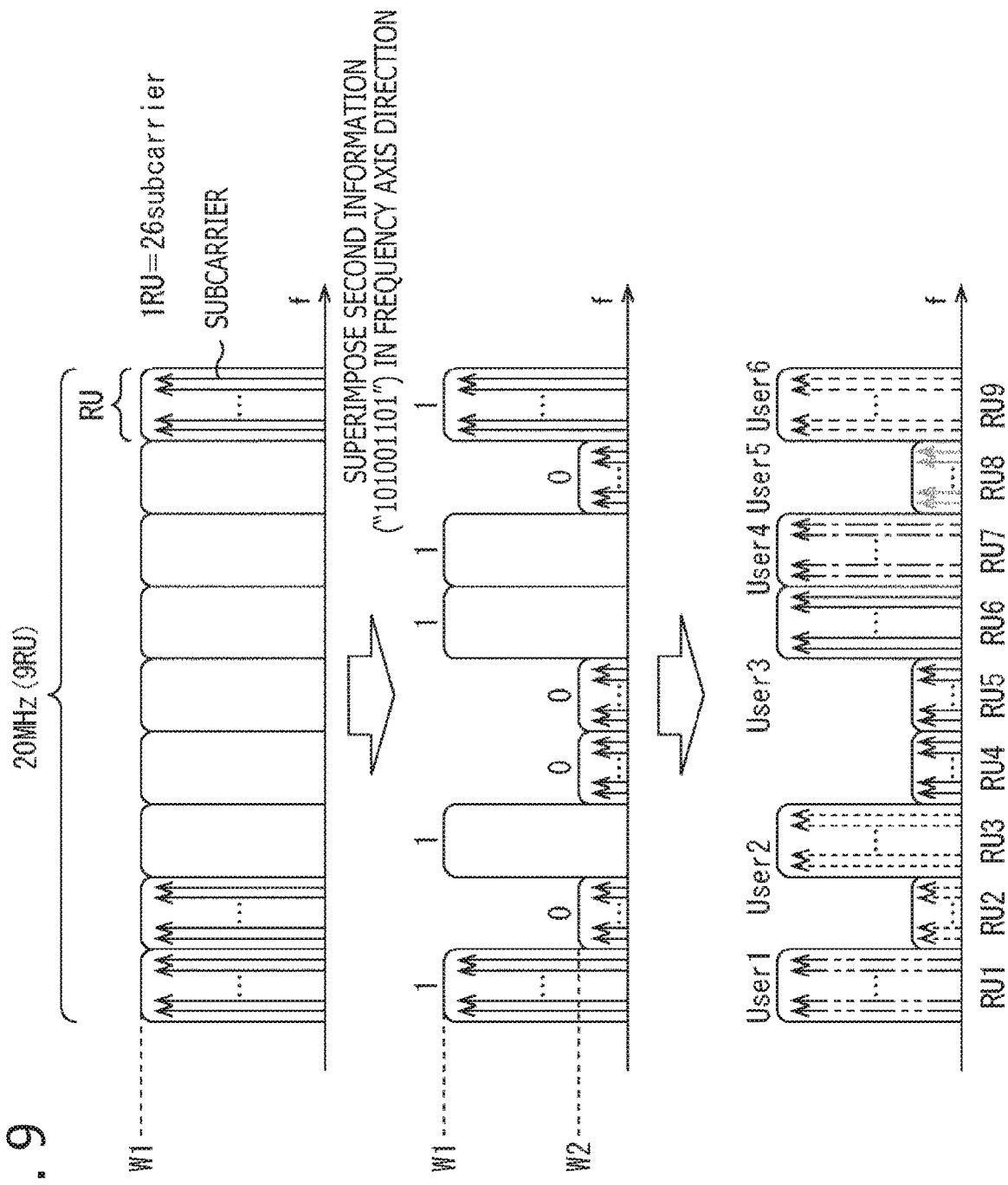
FIG. 9 is a view depicting an example in which a plurality of resource units RU is allocated to a plurality of users in order.

If it is assumed that the nine resource units RU are simply allocated to the client devices STA1 to STA6 of the users 1 to 6 in order, they are allocated in such a manner as depicted in FIG. 9. In FIG. 9, the second information is "101001101" similarly as in the example of FIG. 6.

In particular, if the nine resource units RU into which the channel bandwidth of 20 MHz is divided are denoted as RU1, RU2, . . . , RU9 in the ascending order of the frequency, then the resource unit RU1 is allocated to the client device STA1 of the user 1; the resource units RU2 and RU3 are allocated to the client device STA2 of the user 2; the resource units RU5 to RU6 are allocated to the client device STA3 of the user 3; the resource unit RU7 is allocated to the client device STA4 of the user 4; the resource unit RU8 is allocated to the client device STA5 of the user 5; and the resource unit RU9 is allocated to the client device STA6 of the user 6. The determination of resource allocation is performed in response to the data amount destined for the subordinate client devices STA, and for example, a greater number of resource units RU are allocated to a client device STA having a greater data amount to be transmitted.

It is to be noted that, if it assumed that the frequency band of 20 MHz is divided by 256 subcarriers and the number of subcarriers that are to transmit data among the subcarriers is 234, the number of subcarriers that transmit other than data is 22. For example, if it is assumed to allocate two pilot tones, for example, to each resource unit RU among the 22 subcarriers for other than data, to a user to whom two resource units RU are allocated, four pilot tones are allocated. Actually, however, the number of pilot tones that increases in proportion to the allocated number of resource units RU is sometimes unnecessary. For example, if it is assumed that two pilot tones are sufficient to a user to whom two resource units RU are allocated, the surplus two subcarriers can be allocated to subcarriers for transmitting data. Accordingly, in a case where a plurality of resource units RU is allocated to one user, the number of subcarriers that transmit data sometimes becomes greater than 26×(number of resource units RU). However, in order to simplify the description, it is assumed that the number of subcarriers that transmit data is 26×(the number of resource units RU).

The control section 22 transmits the second information that is superimposition data and information regarding the plurality of client devices STA determined as a transmission destination of the first information and resource allocation to the communication section 23.

Figure 10:
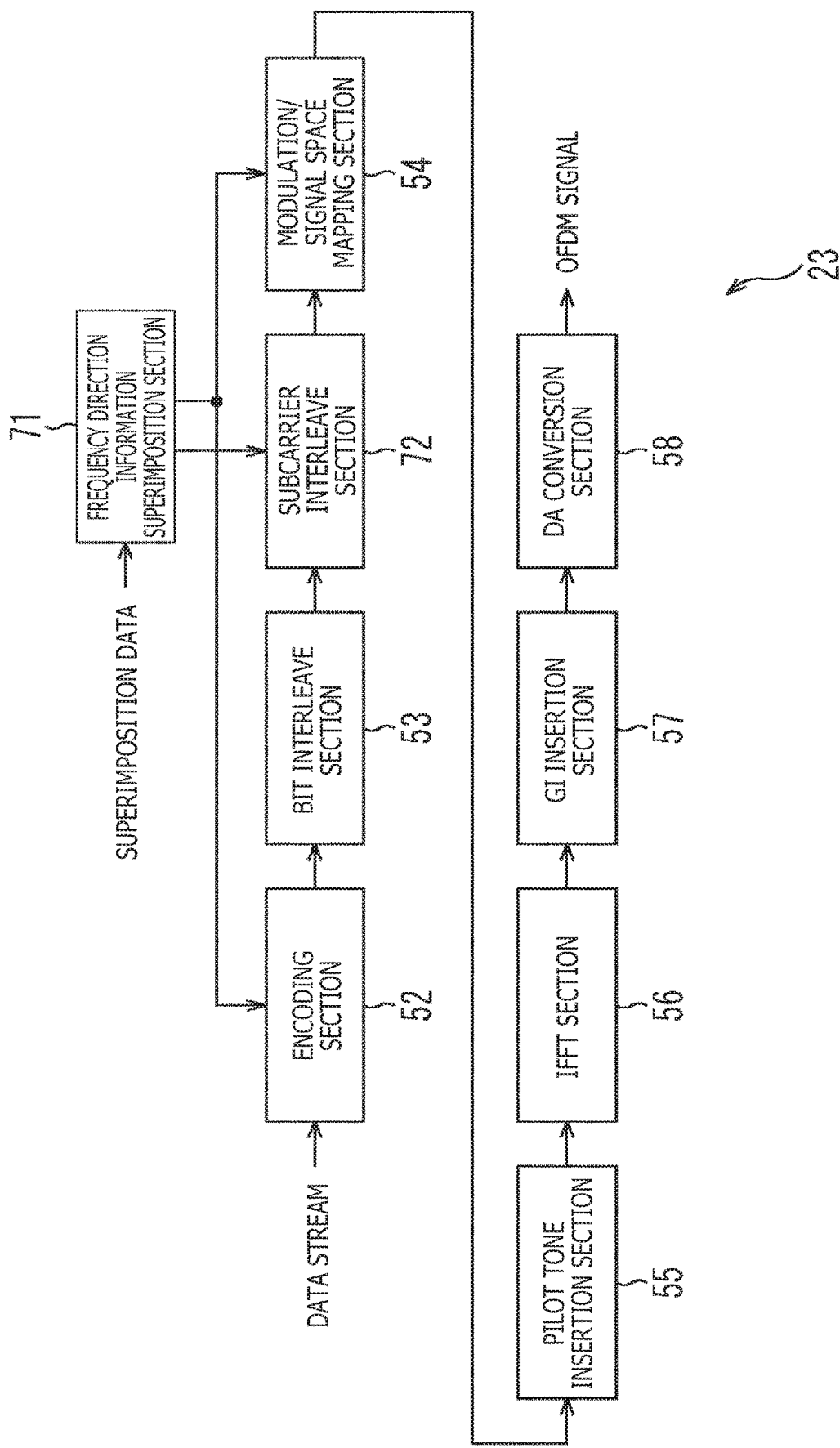
FIG. 10 is a block diagram depicting an example of a configuration of part of the communication section in a case where an OFDM signal is transmitted to a plurality of destinations.

FIG. 10 is a block diagram of an example of part of a configuration of the communication section 23 in a case where the wireless communication apparatus 10 is the base station AP1 that transmits an OFDM signal in which second information is superimposed in a frequency axis direction and an OFDM signal is generated and transmitted with a plurality of client devices STA set as a destination.

In FIG. 10, portions common to those of the configuration in a case where an OFDM signal destined for a single client device STA depicted in FIG. 5 is generated are denoted by like reference signs, and description of the portions is omitted suitably.

The communication section 23 includes a frequency direction information superimposition section 71, an encoding section 52, a bit interleave section 53, a subcarrier interleave section 72, a modulation/signal space mapping section 54, a pilot tone insertion section 55, an IFFT section 56, a GI insertion section 57, and a DA conversion section 58.

Accordingly, the communication section 23 depicted in FIG. 10 is common in the encoding section 52, the bit interleave section 53, the modulation/signal space mapping section 54, the pilot tone insertion section 55, the IFFT section 56, the GI insertion section 57, and the DA conversion section 58 to the communication section 23 of FIG. 5 but is different in the frequency direction information superimposition section 71 and the subcarrier interleave section 72 from the communication section 23 of FIG. 5.

The configuration of FIG. 10 corresponds to the modulation and demodulation section 31, the space signal processing section 32, and the wireless interface section 34 of the communication section 23 of FIG. 2. It is to be noted that the configuration of FIG. 10 is an example and is not restrictive as long as equivalent functions can be implemented.

To the frequency direction information superimposition section 71, second information that is superimposition data and information regarding a plurality of client devices STA that is a transmission destination of the first information and resource allocation is supplied from the control section 22.

The frequency direction information superimposition section 71 performs, in addition to the processes of the frequency direction information superimposition section 51 in which a single client device STA is set as a destination, determination of a subcarrier interleave pattern based on superimposition data (second information) and the information regarding the resource allocation supplied from the control section 22. The subcarrier interleave is to change the arrangement for which the interleave process is to be carried out for each subcarrier, and the subcarrier interleave pattern represents a manner of change of the arrangement of the subcarriers (method of the subcarrier interleave). The unit of subcarriers to be interleaved is sufficient if it is smaller than a subcarrier number (in the current example, 26) for configuring a resource unit RU, and is set to, for example, one or two subcarriers. Information indicative of the determined subcarrier interleave pattern is supplied to the subcarrier interleave section 72.

For example, as illustrated in FIG. 9, in a case where the nine resource units RU1 to RU9 into which the channel bandwidth of 20 MHz is divided are allocated in the order of one, two, three, one, one, and one to the client devices STA1 to STA6 of the users 1 to 6, only the signal power of a particular user possibly decreases by the second information. In this case, the communication characteristic of the user to which the low signal power is allocated degrades.

Figure 11:
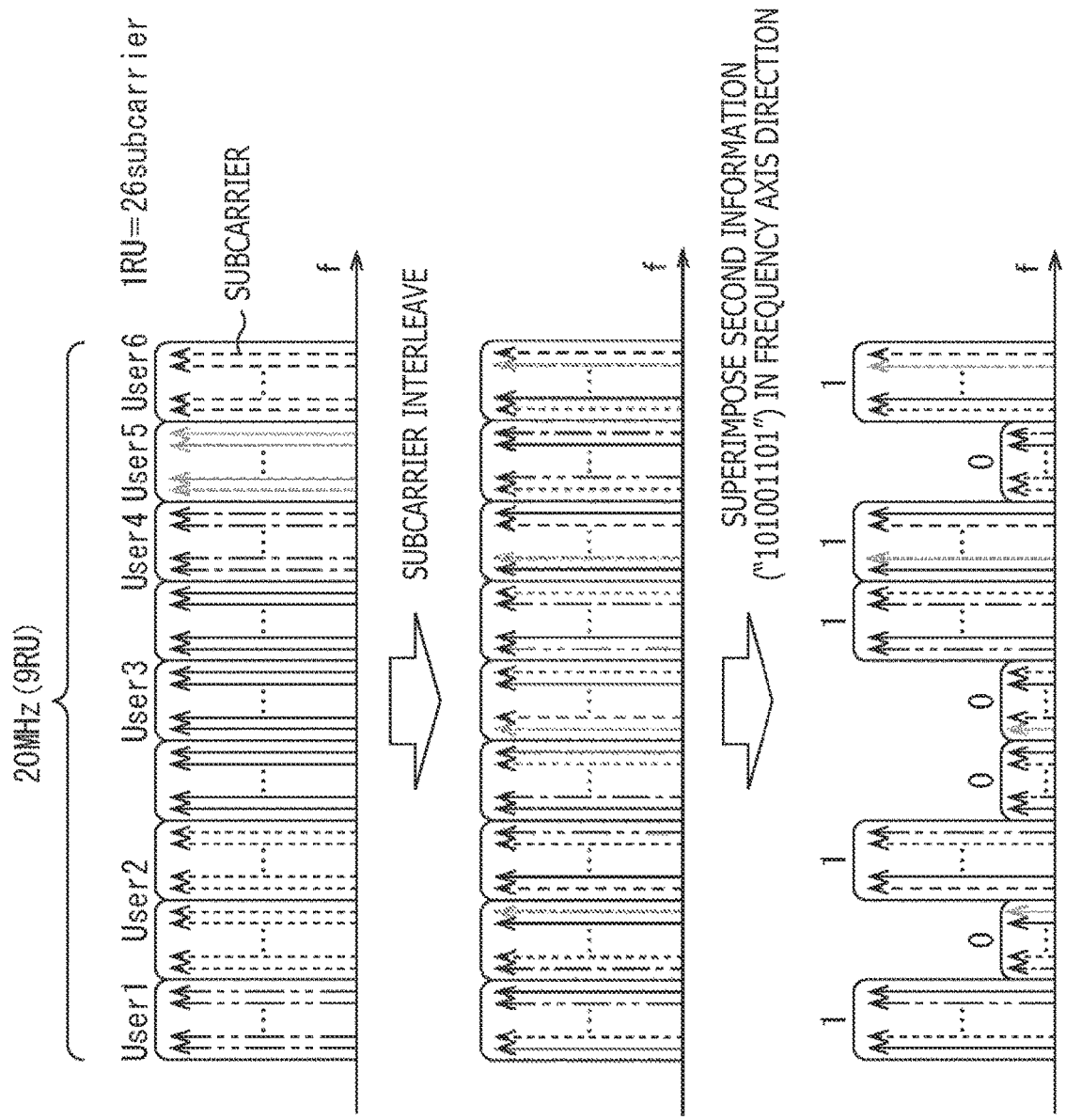
FIG. 11 is a view depicting an example in which a plurality of resource units RU is subjected to subcarrier interleaving and is then allocated to a plurality of users.

In view of this, the frequency direction information superimposition section 71 calculates subcarriers, which are to indicate the first and second power levels from binary second information to be superimposed in the frequency axis direction as depicted in FIG. 11, and determines a subcarrier interleave pattern from the resulting subcarriers and resource allocation amounts to individual destinations such that the signal powers (signal power densities) become uniform as far as possible between the client devices STA. After the subcarrier interleave, from the point of view of the user allocation, the subcarriers indicate a discontinuous arrangement, and subcarriers of a plurality of users are included in one resource unit RU.

The subcarrier interleave pattern can be determined, for example, in the following manner.

For example, the frequency direction information superimposition section 71 has a table in which the subcarrier interleave patterns are associated one to one with the binary information of superimposition data, and selects and determines a subcarrier interleave pattern corresponding to the binary values of the superimposition data.

Alternatively, for example, the frequency direction information superimposition section 71 has a table in which the subcarrier interleave patterns are associated one to one with the binary information of the superimposition data and the plurality of client devices STA that is destinations, and selects and determines a carrier interleave pattern corresponding to the binary information of the superimposition data and the plurality of client devices STA that is destinations. The plurality of client devices STA of the destinations may possess a table in which subcarrier interleave patterns are prepared in a more subdivided state in regard to the number of client devices STA or the number of resource units RU allocated to each client device STA.

Further, for example, the frequency direction information superimposition section 71 has a plurality of subcarrier interleave patterns stored as a table therein, and can calculate signal power for each client device STA when interleave is performed with each subcarrier interleave pattern and select and determine a subcarrier interleave pattern with which the signal powers become most uniform.

Tables of subcarrier interleave patterns corresponding to binary information of superimposition data, subcarrier interleave patterns corresponding to binary information of superimposition data and a plurality of client devices STA that is destinations, and a plurality of selectable subcarrier interleave patterns are stored, for example, in a memory in the frequency direction information superimposition section 71.

In this manner, in a case where an OFDM signal destined for a plurality of client devices STA is to be generated and transmitted, the communication section 23 performs interleave such that a state in which subcarriers are arrayed in units of users as depicted in FIG. 9 is not established but subcarriers of users indicate a discontinuous arrangement and the signal powers become uniform as far as possible among users as depicted in FIG. 11.

Referring back to FIG. 10, similarly to the frequency direction information superimposition section 51, the frequency direction information superimposition section 71 determines first and second power levels that are power levels indicative of binary values, a subcarrier number configuring the resource units RU and first and second MCSs and supplies them to the encoding section 52 and the modulation/signal space mapping section 54 together with the superimposition data.

Further, the frequency direction information superimposition section 71 determines a subcarrier interleave pattern on the basis of the superimposition data and the information regarding resource allocation and supplies information indicative of the determined subcarrier interleave pattern to the subcarrier interleave section 72.

The subcarrier interleave section 72 performs subcarrier interleave on the basis of the information supplied from the frequency direction information superimposition section 71 and indicative of the subcarrier interleave pattern.

Figure 12:
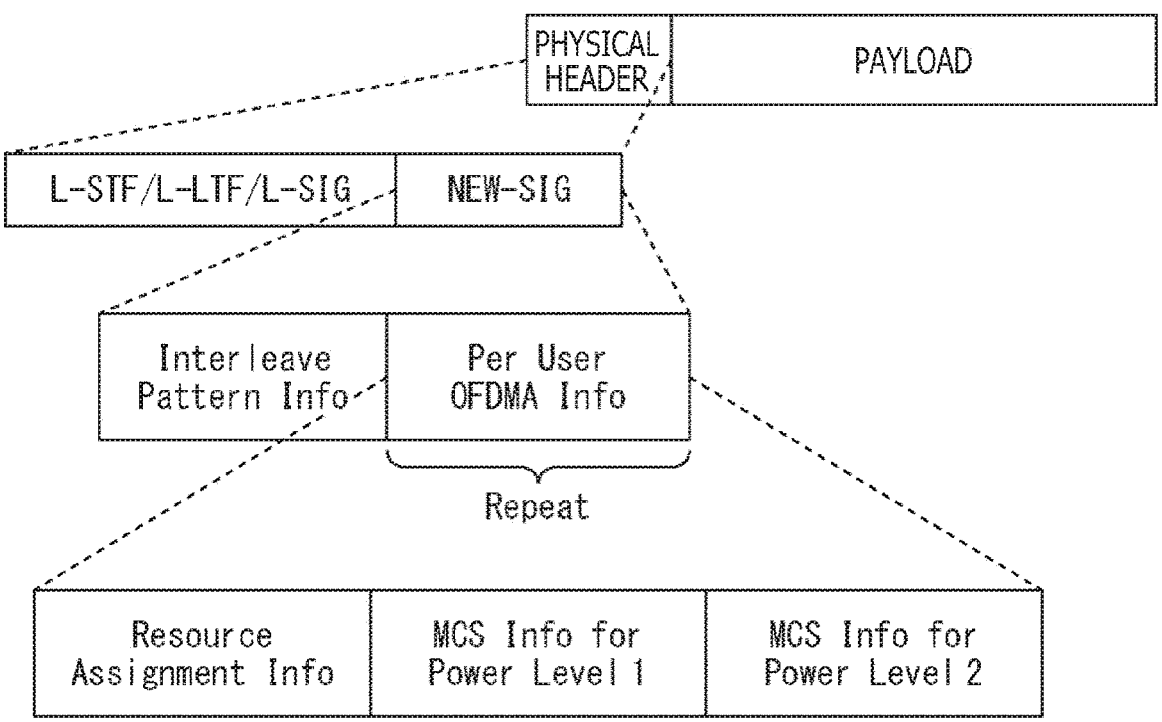
FIG. 12 is a view depicting a frame format of an OFDM signal to be transmitted to a plurality of destinations.

FIG. 12 depicts a frame format of an OFDM signal in a case where the base station AP1 of the BSS 1 transmits an OFDM signal destined for a plurality of client devices STA.

Also in regard to FIG. 12, description of a common portion to the frame format of the OFDM signal depicted in FIG. 7 is suitably omitted.

A point that a frame includes a physical header and a payload and a CRC is added to the tail of the physical header is similar to that in FIG. 7. Also a point that the physical header has an L-STF, an L-LTF and an L-SIG and has a NEW-SIG next to the L-SIG.

However, information stored in the NEW-SIG is different between FIG. 7 and FIG. 12.

The frame of the OFDM signal of FIG. 12 includes, in the NEW-SIG, an Interleave Pattern Info field and a Per User OFDMA info field.

In the Interleave Pattern Info field, information indicative of a subcarrier interleave pattern is stored. By this information, a client device STA of the BSS 1 receiving this OFDM signal can know the interleave method for a subcarrier and becomes possible to return the interleaved subcarrier into the original arrangement.

Further, for example, in such a case that subcarrier interleave patterns are associated one to one with binary information of superimposition data as described hereinabove, if a subcarrier interleave pattern is known, the binary information superimposed in the frequency axis direction can also be discriminated. If the binary information is known, the first and second power levels corresponding to the binary values and by which resource units RU the first and second MCSs are used can also be known.

The Per User OFDMA Info field is placed repeatedly by the number equal to the number of plural client devices STA that are destinations of the OFDMA. For example, as in the example of FIG. 11, in a case where the six client devices STA1 to STA6 corresponding to the users 1 to 6 are determined as a destination, six Per User OFDMA Info fields are placed.

Though not depicted, information regarding how many resource units RU are to be allocated to each of the six client devices STA1 to STA6 corresponding to the users 1 to 6 can also be stored in the NEW-SIG. Further, for example, by associating the order of the Per User OFDMA Info fields with the order of the resource units RU, it can be specified to which resource unit RU the information indicated by a certain Per User OFDMA Info field is related.

Alternatively, in such a case that the subcarrier interleave patterns are associated one to one with binary information of superimposition data and a plurality of client devices STA of destinations as well as the number of resource units RU allocated to the individual client devices STA, if a subcarrier interleave pattern is known, then the number of resource units RU allocated to each client device STA can be known. Therefore, by associating the order of the Per User OFDMA Info fields and the order of the resource units RU with each other, it can be specified to which resource unit RU the information indicated by a certain Per User OFDMA Info field is related.

It is to be noted that the order of the resource units RU in a case where the order of the Per User OFDMA Info fields and the order of the resource units RU are associated with each other is an order of the resource units RU in the arrangement of the subcarriers before subcarrier interleave.

The Per User OFDMA Info field has a Resource Assignment Info field, an MCS Info for Power Level 1 field, and an MCS Info for Power Level 2 field.

The Resource Assignment Info field indicates to which client device STA the resource unit RU is allocated, and, for example, an identifier of the client device STA is stored in the Resource Assignment Info field. From the Resource Assignment Info field, it can be known which resource unit RU is transmitted to the own device after the interleaved subcarrier is returned to its original position.

In the MCS Info for Power Level 1 field, the first MCS is stored, and in the MCS Info for Power Level 2 field, the second MCS is stored.

Since the frame of FIG. 12 is an example in a case where the second information is binary information, in a case where the second information is multi-value information, the number of MCS Info for Power Level fields corresponding to the multi-value are provided similarly as in the case of FIG. 7. From the information stored in the NEW-SIG, the client device STA that is the destination of this OFDM signal can know the MCSs used for signals of different power levels and can perform demodulation and decoding correctly.

<6. Flow Chart of Transmission Process of Transmitting OFDM Signal to Plural Destinations>

Figure 13:
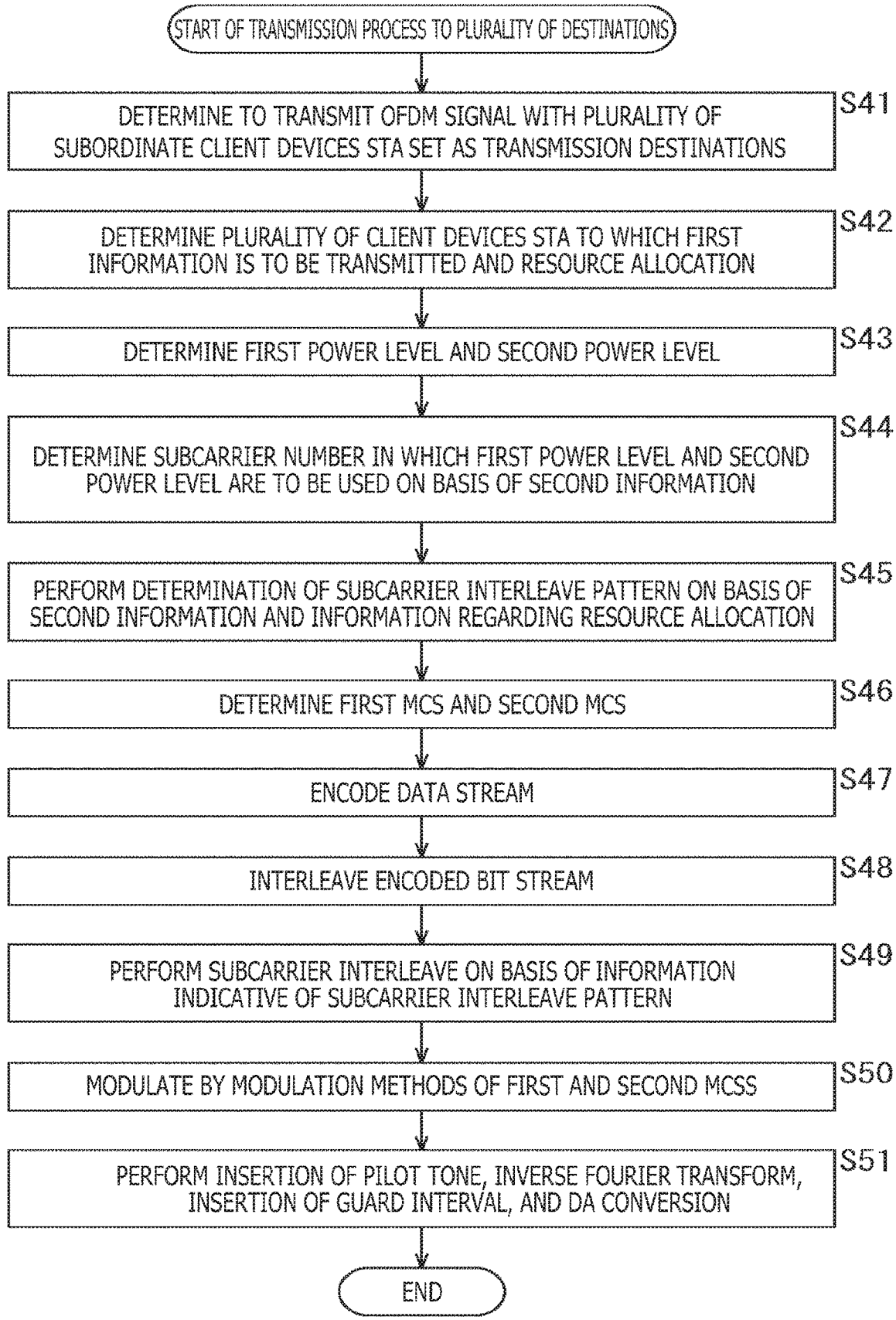
FIG. 13 is a flow chart illustrating a transmission process of transmitting an OFDM signal to a plurality of destinations.

FIG. 13 is a flow chart illustrating a transmission process in a case where the wireless communication apparatus 10 as the base station AP1 of the BSS 1 transmits an OFDM signal in which second information is superimposed in a frequency axis direction to a plurality of destinations.

First in step S41, the control section 22 determines to transmit an OFDM signal with a plurality of subordinate client devices STA set as a transmission destination and determines (generates) and supplies second information to be made superimposition data to the frequency direction information superimposition section 71.

In step S42, the control section 22 determines a plurality of client devices STA to which first information is to be transmitted and resource allocation to the client devices STA. The plurality of client devices STA to which the first information is to be transmitted is determined depending upon the data amount to be destined for the subordinate client devices STA, a request from a subordinate client device STA, or the like.

Further, similarly as in the transmission process to a single destination, in parallel to steps S41 and S42, the first information to be transmitted to the client devices STA of the transmission destination is packetized, and a data stream in which a MAC header including the identifier of the client devices STA of the destination, error detection codes, and so forth are added to the packet is inputted from the data processing section 21 (FIG. 2) to the encoding section 52.

In step S43, the frequency direction information superimposition section 71 determines a first power level and a second power level. The first power level and the second power level are set so as to have a power difference therebetween such that the base station AP2 and the STA 11 of the BSS 2 that is another BSS can identify the first power level and the second power level.

In step S44, the frequency direction information superimposition section 71 determines subcarrier numbers in which the first power level and the second level are to be used on the basis of second information to be superimposed in the frequency axis direction. In other words, the frequency direction information superimposition section 71 determines subcarrier numbers of resource units RU that are setting units of the first and second power level.

In step S45, the frequency direction information superimposition section 71 performs determination of a subcarrier interleave pattern on the basis of the second information and the information regarding the resource allocation supplied as the superimposition data from the control section 22. The information regarding the resource allocation represents which resource units RU (what number of resource units RU) are individually to be allocated to which client devices STA among the plurality of client devices STA determined to transmit the first information by the control section 22 in step S42 described above.

In step S46, the frequency direction information superimposition section 71 determines a first MCS to be used for the subcarriers for which the first power level is to be used and a second MCS to be used for the subcarriers for which the second power level is to be used.

Further, in step S46, the frequency direction information superimposition section 71 supplies the determined first and second power levels, subcarrier numbers that are setting units of the first and second power level, and first and second MCSs to the encoding section 52 and the modulation/signal space mapping section 54 together with the superimposition data. Further, the frequency direction information superimposition section 71 supplies information indicative of the determined subcarrier interleave pattern to the subcarrier interleave section 72.

In step S47, the encoding section 52 encodes a data stream inputted from the data processing section 21 by convolution encoding or LDPC encoding on the basis of the first and second MCSs supplied from the frequency direction information superimposition section 71 and supplies an encoded bit stream obtained as a result of the encoding to the bit interleave section 53.

In step S48, the bit interleave section 53 interleaves and supplies the encoded bit stream from the encoding section 52 to the modulation/signal space mapping section 54.

In step S49, the subcarrier interleave section 72 performs subcarrier interleave on the basis of the information indicative of the subcarrier interleave pattern supplied from the frequency direction information superimposition section 71.

In step S50, the modulation/signal space mapping section 54 modulates the encoded bit stream after subcarrier interleaved by modulation methods of the first and second MCSs supplied from the frequency direction information superimposition section 71 and supplies resulting encoded bit streams to the pilot tone insertion section 55.

In step S51, insertion of a pilot tone, inverse Fourier transform, insertion of a guard interval, and DA conversion are performed in order, and an OFDM signal is generated to be outputted to the amplification section 35 (FIG. 2).

In particular, in step S51, the pilot tone insertion section 55 inserts a subcarrier that transmits a pilot tone into and adds a physical header to a subcarrier that transmits data, and supplies a resulting signal to the IFFT section 56. The IFFT section 56 inverse Fourier transforms the subcarriers supplied from the pilot tone insertion section 55 and supplies a resulting signal to the GI insertion section 57. The GI insertion section 57 inserts a guard interval into the signal supplied from the IFFT section 56 and supplies a resulting signal to the DA conversion section 58. The DA conversion section 58 converts the digital signal supplied from the GI insertion section 57 into an analog signal and supplies an OFDM signal obtained as a result of the conversion to the amplification section 35 (FIG. 2). The OFDM signal supplied to the amplification section 35 is amplified and then sent out as an electromagnetic wave from the antenna 36.

The transmission process in a case where an OFDM signal in which second information is superimposed in the frequency axis direction is transmitted to a plurality of destinations is executed in such a manner as described above.

According to the transmission process of generating and transmitting an OFDM signal destined for a plurality of client devices STA described above, since subcarrier interleave is performed such that transmission power becomes uniformized as far as possible among different users, it is possible to suppress only transmission power to a specific user from decreasing while second information is superimposed in the frequency axis direction. Consequently, inequality among a plurality of users that is transmission destinations can be prevented, and appropriate scheduling can be performed.

It is to be noted that, in the example described above, determination of a plurality of client devices STA to which first information is to be transmitted and resource allocation, which is performed in step S42, is performed by the control section 22. However, the determination may be performed by the frequency direction information superimposition section 71.

<7. Example of Configuration in Case where OFDM Signal of Single Destination is Received>

Next, a process in a case where the wireless communication apparatus 10 that operates as a base station AP or a client device STA receives an OFDM signal in which second information is superimposed in the frequency axis direction is described.

First, a case is described in which the wireless communication apparatus 10 that is a client device STA of the BSS 1 same as that of the transmission source receives an OFDM signal of a single destination.

Figure 14:
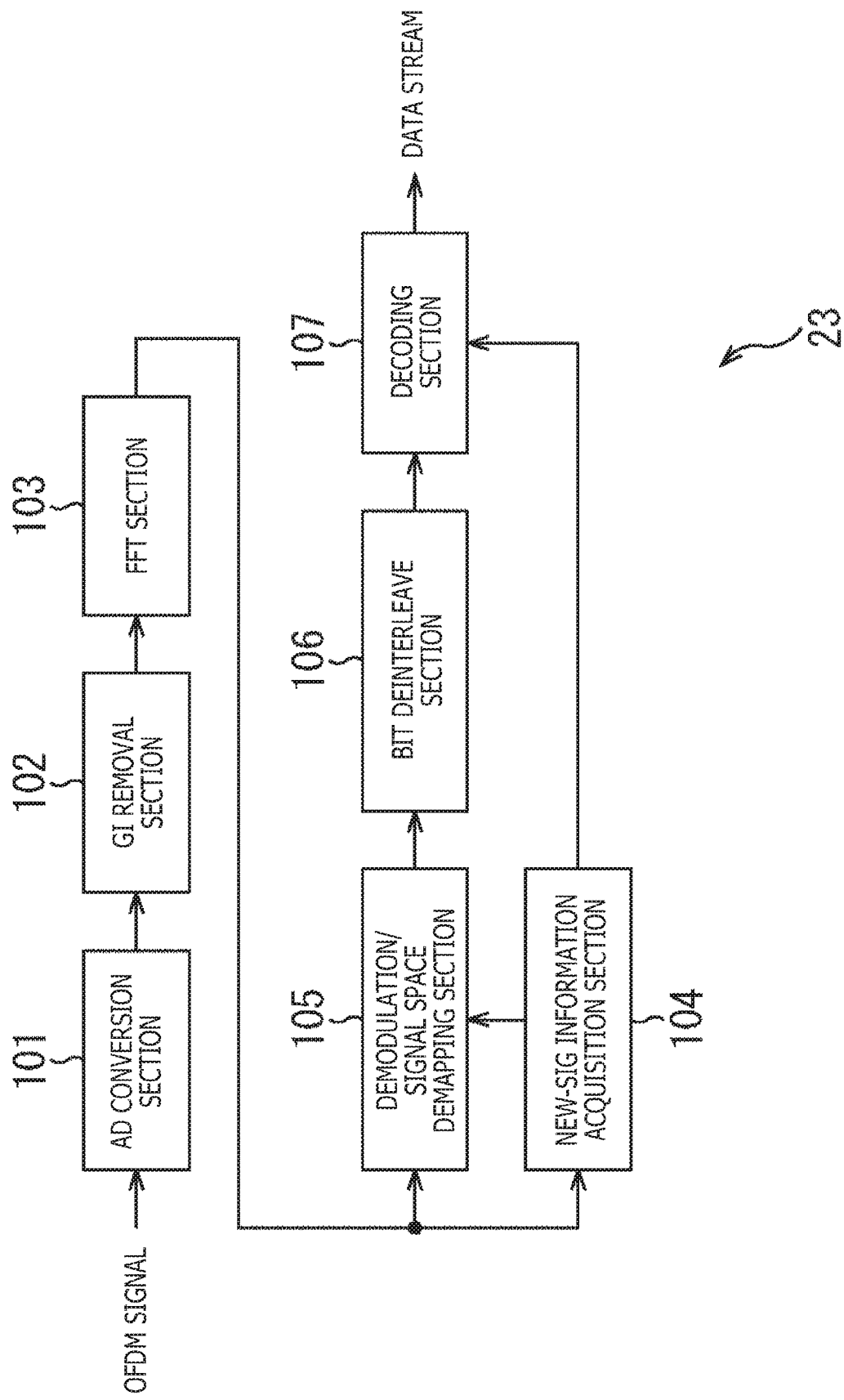
FIG. 14 is a block diagram depicting an example of a configuration of part of the communication section in a case where an OFDM signal of a single destination is received.

FIG. 14 is a block diagram depicting an example of a configuration of part of the communication section 23 in a case where the wireless communication apparatus 10 that is a client device STA of the BSS 1 same as that of the transmission source receives an OFDM signal of a single destination.

The communication section 23 includes an AD conversion section 101, a GI removal section 102, an FFT section 103, a NEW-SIG information acquisition section 104, a demodulation/signal space demapping section 105, a bit deinterleave section 106, and a decoding section 107.

The configuration of FIG. 14 corresponds to the modulation and demodulation section 31, the space signal processing section 32, and the wireless interface section 34 of the communication section 23 of FIG. 2. It is to be noted that the configuration of FIG. 14 is an example and is not restrictive if equivalent functions can be implemented.

An OFDM signal obtained by performing an amplification process, down convert from the carrier frequency, filtering, and so forth for an analog signal received by the antenna 36 is supplied to the AD conversion section 101.

The AD conversion section 101 converts the analog OFDM signal into a digital signal and supplies the digital signal to the GI removal section 102.

The GI removal section 102 removes the guard interval added to the signal supplied from the AD conversion section 101 and supplies a resulting signal to the FFT section 103. The FFT section 103 Fourier transforms the signal, from which the guard interval has been removed by the GI removal section 102, and supplies a signal obtained as a result of the Fourier transform to the NEW-SIG information acquisition section 104 and the demodulation/signal space demapping section 105.

The NEW-SIG information acquisition section 104 acquires first and second MCSs from the NEW-SIG of the physical header of a frame supplied from the FFT section 103 and supplies the first and second MCSs to the demodulation/signal space demapping section 105 and the decoding section 107.

The demodulation/signal space demapping section 105 demodulates the OFDM signal supplied from the FFT section 103 on the basis of the first and second MCSs supplied from the NEW-SIG information acquisition section 104, demaps information mapped to the signal space and supplies a resulting signal to the bit deinterleave section 106.

The bit deinterleave section 106 returns bits replaced by the interleave process to their original positions and supplies resulting bits to the decoding section 107.

The decoding section 107 decodes the encoded bits on the basis of the first and second MCSs supplied from the NEW-SIG information acquisition section 104, converts the decoded bits into serial data and outputs the serial data as a data stream.

The foregoing makes it possible to allow an OFDM signal transmitted from the base station AP1 of the BSS 1 to be received by the wireless communication apparatus 10 as a client device STA of the destination.

<8. Example of Configuration in Case where OFDM Signal of Plural Destinations is Received>

Next, a case in which an OFDM signal whose transmission destination is a plurality of client devices STA is received is described.

Figure 15:
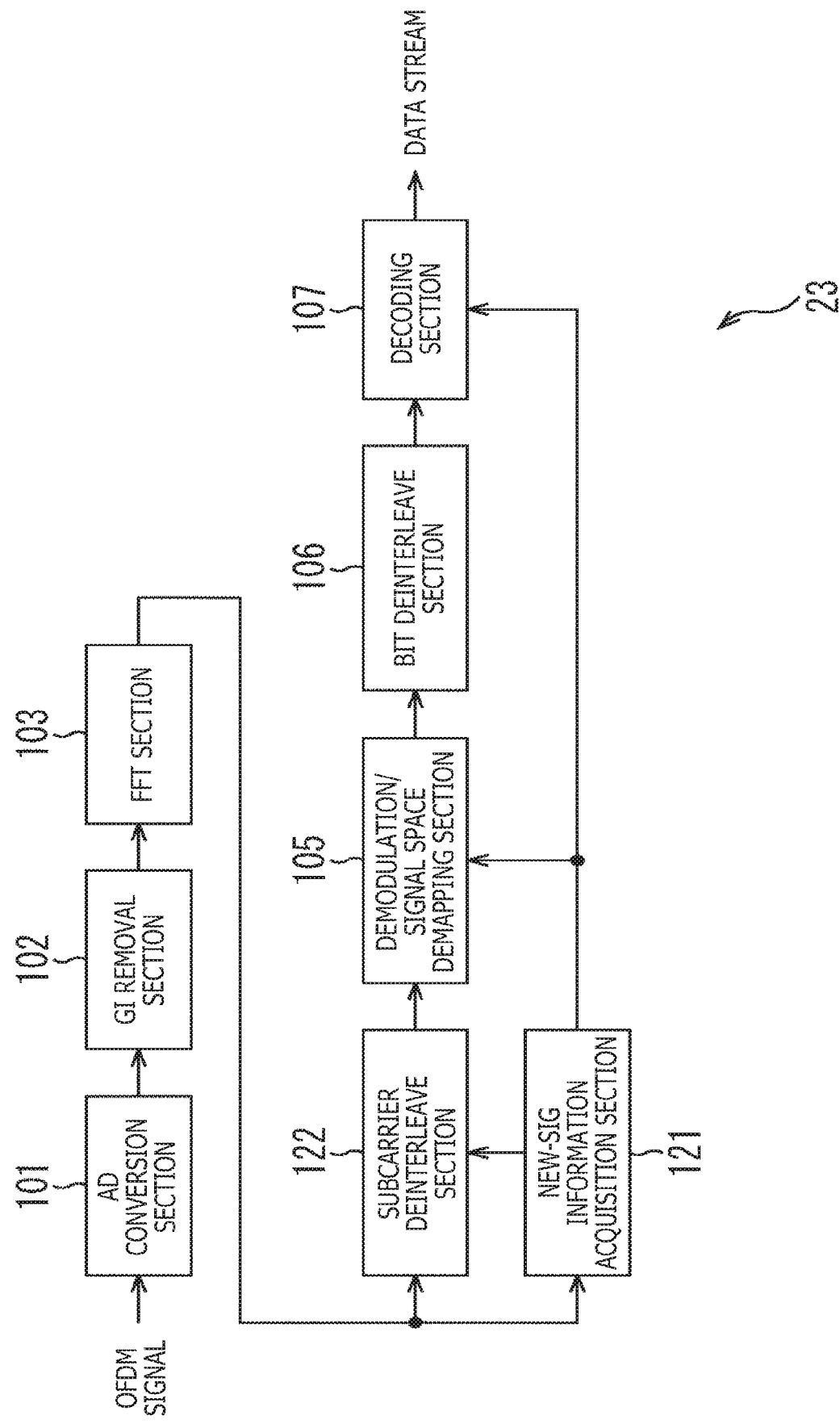
FIG. 15 is a block diagram depicting an example of a configuration of part of the communication section in a case where an OFDM signal of a plurality of destinations is received.

FIG. 15 is a block diagram depicting an example of configuration of part of the communication section 23 in a case where the wireless communication apparatus 10 that is a client device STA of the BSS 1 same as that of the transmission source receives an OFDM signal of a plurality of destinations.

In FIG. 15, portions common to those of the configuration in a case where an OFDM signal destined for a single client device STA depicted in FIG. 14 is received are denoted by like reference sign, and description of the portions is omitted suitably.

The communication section 23 includes an AD conversion section 101, a GI removal section 102, an FFT section 103, a NEW-SIG information acquisition section 121, a subcarrier deinterleave section 122, a demodulation/signal space demapping section 105, a bit deinterleave section 106 and a decoding section 107.

Accordingly, the communication section 23 depicted in FIG. 15 is common to the communication section 23 of FIG. 14 in the AD conversion section 101, the GI removal section 102, the FFT section 103, the demodulation/signal space demapping section 105, the bit deinterleave section 106, and the decoding section 107 and is different from the communication section 23 of FIG. 14 in the NEW-SIG information acquisition section 121 and the subcarrier deinterleave section 122. The subcarrier deinterleave section 122 is newly provided, and the NEW-SIG information acquisition section 121 replaces the NEW-SIG information acquisition section 104.

The configuration of FIG. 15 corresponds to the modulation and demodulation section 31, the space signal processing section 32, and the wireless interface section 34 of the communication section 23 of FIG. 2. It is to be noted that the configuration of FIG. 15 is an example and is not restrictive if similar functions can be implemented.

A signal after Fourier transformed by the FFT section 103 is supplied to the NEW-SIG information acquisition section 121 and the subcarrier deinterleave section 122.

The NEW-SIG information acquisition section 121 confirms from the NEW-SIG of the physical header supplied from the FFT section 103 whether there is data (first information) for the destined apparatus. More particularly, the NEW-SIG information acquisition section 121 confirms whether the identifier of the destined apparatus is stored in the Resource Assignment Info field of the Per User OFDMA Info field of NEW-SIG of the physical header to confirm whether the received signal includes a resource unit RU for the destined apparatus. This resource unit RU is a subcarrier arrangement before subcarrier interleave.

Further, the NEW-SIG information acquisition section 121 acquires information indicative of a subcarrier interleave pattern from the NEW-SIG of the physical header supplied from the FFT section 103. The information indicative of the subcarrier interleave pattern is stored in the Interleave Pattern Info field of the NEW-SIG of the physical header as described hereinabove. The acquired information indicative of the subcarrier interleave pattern is supplied to the subcarrier deinterleave section 122.

Furthermore, the NEW-SIG information acquisition section 121 acquires binary second information superimposed in the frequency axis direction on the basis of the power level of the signal supplied from the FFT section 103 and recognizes which of the first MCS or the second MCS is used in each resource unit RU. Then, the NEW-SIG information acquisition section 121 recognizes, from the resource unit RU for the destined apparatus and the subcarrier interleave pattern, each subcarrier for the destined apparatus and which of the first MCS or the second MCS is used in the subcarrier.

In particular, from the binary second information detected on the basis of the power level of the signal and the information stored in the NEW-SIG of the physical header, information relating to a resource for the destined apparatus, in particular, each subcarrier for the destined apparatus and which of the first MCS or the second MCS is used in the subcarrier are specified. The information relating to the resource for the destined apparatus is also supplied from the NEW-SIG information acquisition section 121 to the subcarrier deinterleave section 122.

It is to be noted that, in such a case that subcarrier interleave patterns are associated one to one with binary information of superimposition data, if the subcarrier interleave pattern is known, the binary information superimposed in the determination frequency axis direction can also be obtained as described hereinabove, and therefore, it is possible to recognize the binary information without detecting the power level of the signal supplied from the FFT section 103 and specify on the basis of the binary information which of the first MCS or the second MCS is used in each subcarrier.

Furthermore, the NEW-SIG information acquisition section 121 acquires the first and second MCSs from the MCS Info for Power Level 1 field and the MCS Info for Power Level 2 field of the Per User OFDMA Info field for the destined apparatus in the NEW-SIG of the physical header supplied from the FFT section 103, and supplies the first and second MCSs to the demodulation/signal space demapping section 105 and the decoding section 107.

The subcarrier deinterleave section 122 performs a deinterleave process of each subcarrier of the OFDM signal supplied from the FFT section 103 on the basis of the information indicative of the subcarrier interleave pattern supplied from the NEW-SIG information acquisition section 121 (returns the arrangement of the received subcarriers into an original arrangement before the subcarriers are sorted on the transmission side). Then, the subcarrier deinterleave section 122 acquires, on the basis of the information relating the resource for the destined apparatus, (only) the subcarriers for the destined apparatus from the resource unit RU for the destined apparatus and supplies the subcarriers to the demodulation/signal space demapping section 105.

The demodulation/signal space demapping section 105 demodulates the OFDM signal supplied from the subcarrier deinterleave section 122 on the basis of the first and second MCSs supplied from the NEW-SIG information acquisition section 121. Further, the demodulation/signal space demapping section 105 demaps the information mapped to the signal space and supplies the demapped information to the bit deinterleave section 106. The OFDM signal supplied from the subcarrier deinterleave section 122 is a signal in which (only) the subcarriers for the destined apparatus are interleaved on the basis of the subcarrier interleave pattern.

<9. Flow Chart of Reception Process of Receiving OFDM Signal of Plurality of Destinations>

Figure 16:
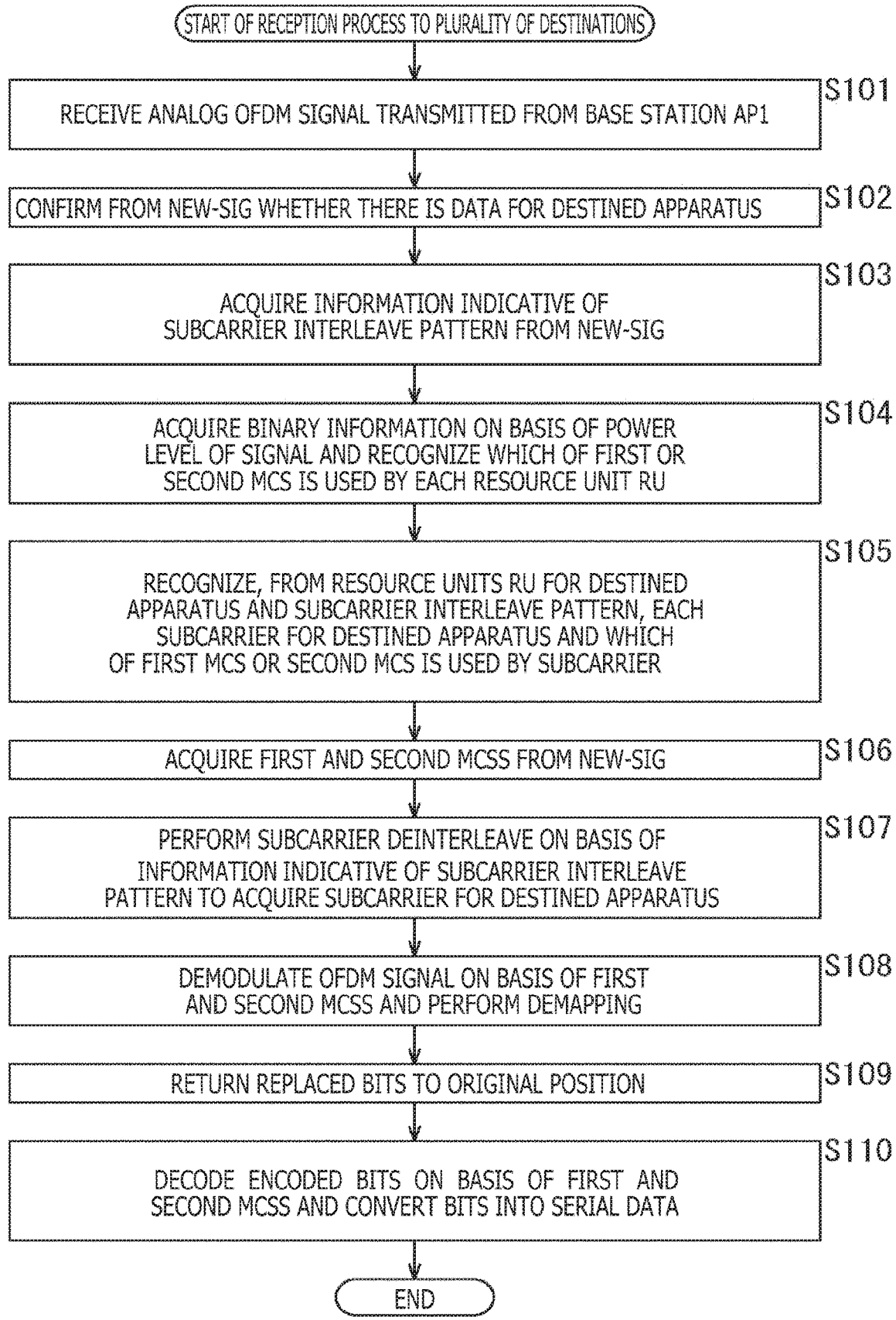
FIG. 16 is a flow chart illustrating a reception process of receiving an OFDM signal of a plurality of destinations.

FIG. 16 is a flow chart illustrating a reception process in a case where a wireless communication apparatus 10 that is the base station AP1 of the BSS 1 executes OFDMA and a wireless communication apparatus 10 that is a client device STA of the BSS 1 same as that of the transmission source receives an OFDM signal that includes a plurality of client devices STA as a transmission destination and has second information superimposed in the frequency axis direction.

First in step S101, the wireless communication apparatus 10 that is a client device STA of the BSS 1 receives an analog OFDM signal transmitted from the base station AP1 of the same BSS 1 by the antenna 36. The wireless communication apparatus 10 that is a client device STA of the BSS 1 performs, for the received analog OFDM signal, amplification by the amplification section 35, AD conversion by the AD conversion section 101, removal of the guard interval by the GI removal section 102 and Fourier transform by the FFT section 103. Then, a signal after the Fourier transform is supplied to the NEW-SIG information acquisition section 121 and the subcarrier deinterleave section 122.

In step S102, the NEW-SIG information acquisition section 121 confirms from the NEW-SIG of the physical header supplied from the FFT section 103 whether there is data (first information) for the destined apparatus. More particularly, the NEW-SIG information acquisition section 121 confirms whether or not the identifier of the destined apparatus is stored in the Resource Assignment Info field of the Per User OFDMA Info field of the NEW-SIG of the physical header to confirm whether or not the received signal includes a resource unit RU for the destined apparatus.

In step S103, the NEW-SIG information acquisition section 121 acquires information indicative of a subcarrier interleave pattern from the NEW-SIG of the physical header supplied from the FFT section 103.

In step S104, the NEW-SIG information acquisition section 121 acquires binary second information superimposed in the frequency axis direction on the basis of the power level of the signal supplied from the FFT section 103 and recognizes which of the first MCS or the second MCS is used in each resource unit RU.

In step S105, the NEW-SIG information acquisition section 121 recognizes, from the resource unit RU for the destined apparatus and the carrier interleave pattern, each subcarrier for the destined apparatus and which of the first MCS or the second MCS is used in the subcarrier.

In step S106, the NEW-SIG information acquisition section 121 acquires the first and second MCSs from the MCS Info for Power Level 1 field and the MCS Info for Power Level 2 field of the Per User OFDMA Info field for the destined apparatus in the NEW-SIG of the physical header supplied from the FFT section 103 and supplies the first and second MCSs to the demodulation/signal space demapping section 105 and the decoding section 107.

In step S107, the subcarrier deinterleave section 122 performs subcarrier deinterleave of the OFDM signal supplied from the FFT section 103 on the basis of the information indicative of the subcarrier interleave pattern supplied from the NEW-SIG information acquisition section 121. Then, the subcarrier deinterleave section 122 acquires the subcarriers for the destined apparatus from the resource units RU for the destined apparatus on the basis of the information relating to the resources for the destined apparatus and supplies the subcarriers to the demodulation/signal space demapping section 105.

In step S108, the demodulation/signal space demapping section 105 demodulates the OFDM signal supplied from the subcarrier deinterleave section 122 on the basis of the first and second MCSs supplied from the NEW-SIG information acquisition section 121, demaps the information mapped to the signal space and supplies a result of the demapping to the bit deinterleave section 106.

In step S109, the bit deinterleave section 106 returns the replaced bits to the original position and supplies the resulting bits to the decoding section 107.

In step S110, the decoding section 107 decodes the encoded bits on the basis of the first and second MCSs supplied from the NEW-SIG information acquisition section 121, converts the decoded bits into serial data and outputs the serial data as a data stream.

The foregoing makes it possible for an OFDM signal, whose transmission destination is simultaneously set to a plurality of client devices STA, to be received by each of the wireless communication apparatuses 10 of the client devices STA serving as the destinations.

It is to be noted that, since the information stored in the NEW-SIG of the physical header is only information regarding the first and second MCSs, the reception process in a case where an OFDM signal of a single destination is received becomes a process of, by the NEW-SIG information acquisition section 104, executing a process of acquiring the first and second MCSs from the NEW-SIG of the physical header and supplying the first and second MCSs to the demodulation/signal space demapping section 105 and the decoding section 107 in place of the processes in steps S102 to S107.

<10. Example of Configuration of Wireless Communication Apparatus of Another BSS>

Next, a reception process of a wireless communication apparatus 10 belonging to the BSS 2 different from the BSS 1 of the base station AP1 is described.

The base station AP2 and the STA 11 of the BSS 2 receive a transmission signal that is transmitted from the base station AP1 to the subordinate client devices STA and in which second information is superimposed in the frequency axis direction of an OFDM signal including first information to acquire second information.

FIG. 17 is a block diagram depicting an example of a configuration of part of the communication section 23 of the wireless communication apparatus 10 as the base station AP2 or the STA 11 of the BSS 2.

It is to be noted that the configuration of the wireless communication apparatus 10 belonging to the BSS 2 different from the BSS 1 of the base station AP1 is same not only in a case where a transmission signal transmitted from the base station AP1 to a single subordinate client device STA but also in a case where a transmission signal transmitted to a plurality of client devices STA is received.

The communication section 23 includes an AD conversion section 141, a simple frequency synchronization section 142, a GI removal section 143, an FFT section 144, and a superimposition data acquisition section 145.

The configuration of FIG. 17 corresponds to the modulation and demodulation section 31, the space signal processing section 32, and the wireless interface section 34 of the communication section 23 of FIG. 2. It is to be noted that the configuration of FIG. 17 is an example and is not restrictive if equivalent functions can be implemented.

An OFDM signal obtained by performing amplification, down convert from a carrier frequency, filtering, and so forth for an analog signal received by the antenna 36 is supplied to the AD conversion section 101.

The AD conversion section 101 converts the analog OFDM signal into a digital signal and supplies the digital signal to the simple frequency synchronization section 142.

The simple frequency synchronization section 142 detects periodicity of the OFDM signal supplied from the AD conversion section 101 to perform frequency synchronization. For example, the simple frequency synchronization section 142 detects rough periodicity from a repeat pattern of symbols of the OFDM signal to perform frequency synchronization. The simple frequency synchronization section 142 supplies information related to the detected frequency synchronization to the GI removal section 143 together with the OFDM signal supplied from the AD conversion section 101.

The GI removal section 143 removes the guard interval added to the OFDM signal supplied from the simple frequency synchronization section 142 and supplies a resulting signal to the FFT section 144. The FFT section 144 Fourier transforms the signal obtained by the removal of the guard interval by the GI removal section 143 and supplies a resulting signal to the superimposition data acquisition section 145.

The superimposition data acquisition section 145 detects the power level of a resource unit RU configured from one or more subcarriers for signals supplied from the FFT section 144. Then, the superimposition data acquisition section 145 identifies the detected power level between two levels with a predetermined threshold value and identifies which either of 0 or 1 of the binary information is indicated by the resource unit RU. It is to be noted that, in a case where superimposition data is multi-value data, identification among the multi values is performed using a plurality of threshold values. The superimposition data acquisition section 145 supplies the identified binary information as superimposition data to the control section 22 (FIG. 2).

<11. Flow Chart of Reception Process in Wireless Communication Apparatus of Another BSS>

FIG. 18 is a flow chart of a reception process by which the wireless communication apparatus 10 that is the base station AP2 or the STA 11 belonging to the BSS 2 receives a transmission signal transmitted from the base station AP1 to the subordinate client devices STA to acquire second information.

First in step S141, the wireless communication apparatus 10 that is the base station AP2 or the STA 11 receives an analog OFDM signal, which is a transmission signal transmitted from the base station AP1 and in which second information is superimposed in the frequency axis direction of the OFDM signal that includes first information, by the antenna 36. The analog OFDM signal received by the antenna 36 is amplified by the amplification section 35, AD converted by the AD conversion section 101, and then supplied to the simple frequency synchronization section 142.

In step S142, the simple frequency synchronization section 142 detects periodicity of the OFDM signal supplied from the AD conversion section 101 to perform frequency synchronization. The simple frequency synchronization section 142 supplies information relating to the detected frequency synchronization to the GI removal section 143 together with the OFDM signal supplied from the AD conversion section 101.

In step S143, the GI removal section 143 performs removal of the guard interval, and the FFT section 144 performs Fourier transform. In particular, the GI removal section 143 removes the guard interval added to the OFDM signal supplied from the simple frequency synchronization section 142 and supplies a resulting signal to the FFT section 144. Then, the FFT section 144 Fourier transforms the signal obtained by the removal of the guard interval by the GI removal section 143 and supplies a resulting signal to the superimposition data acquisition section 145.

In step S144, the superimposition data acquisition section 145 detects the power level of the signal supplied from the FFT section 144 in a unit of a resource unit RU to acquire superimposition data. For example, the superimposition data acquisition section 145 identifies an average value or a median of power levels of a plurality of subcarriers configuring the resource unit RU between two levels with a predetermined threshold value and identifies which of 0 or 1 of the binary information is indicated by the resource unit RU. The acquired superimposition data is supplied, for example, to the control section 22 (FIG. 2).

By the foregoing reception process, as has been described with reference to FIG. 4, the wireless communication apparatus 10 that is the base station AP2 or the STA 11 belonging to the BSS 2 can acquire second information superimposed in the frequency axis direction from the OFDM signal transmitted from the base station AP1 of the BSS 1 to the subordinate client devices STA and including first information.

Since the wireless communication apparatus 10 as the base station AP2 or the STA 11 of the BSS 2 performs simple frequency synchronization of detecting periodicity of an OFDM signal and performing synchronization, even in a case where the OFDM signal is received from the middle and information necessary for frequency synchronism such as the L-LTF or the L-STF in the physical header fails to be received, superimposed second information can be acquired simply by modulation in response to a power component in the frequency axis direction.

By making second information to be superimposed in the frequency axis direction part of information to be stored in the physical header, even in a case where the physical header is not received, it is possible to transmit desired information.

As an example of the information to be transmitted as the second information, for example, information for performing cooperative operation between the base stations AP is available. As the cooperative operation between the base stations AP, for example, spatial reuse described hereinabove, scheduling of adjusting the transmission timing in the time direction, and so forth are available. As the information for performing cooperative operation between the base stations AP, for example, an identifier of the base station AP of the transmission source, information relating to transmission power of a transmission signal and a modulation encoding method of the base station AP of the transmission source, a permissible interference power level of the wireless communication apparatus 10 on the reception side, and so forth can be transmitted.

Although, in the example described above, an example in which the channel bandwidth is 20 MHz is indicated, the channel bandwidth is not limited to 20 MHz. Further, although the second information is binary data of 9 bits, the bit number of the second information is not restricted to 9 bits and may be a bit number other than 9.

Further, although the number of resource units RU when the channel bandwidth is divided and the number of bits of the second information are same as each other in order to facilitate the description, the number of resource units RU and the bit number of the second information may be different from each other.

Furthermore, although the number of resource units RU and the subcarrier number configuring one resource unit RU are made same between a case in which a single destination is applied and a case in which a plurality of destinations is applied, the number of resource units RU and the subcarrier number configuring one resource unit RU may be different from each other between the case in which a single destination is applied and the case in which a plurality of destinations is applied.

Further, while, in the example described above, a functional configuration, a transmission process, and a reception process are described separately between the case in which a single destination is applied and the case in which a plurality of destinations is applied in order to facilitate understanding, it is a matter of course that a single wireless communication apparatus 10 includes all of the functions.

<12. Example of Configuration of Computer>

While the series of processes described above can be executed by hardware, it can be executed also by software. In a case where the series of processes is executed by software, a program that constitutes the software is installed into a computer. The computer here includes a microcomputer incorporated in hardware for exclusive use, a personal computer, for example, for universal use that can execute various functions by installing various programs, and so forth.

FIG. 19 is a block diagram depicting an example of a hardware configuration of a computer that executes the series of processes described hereinabove by a program.

In the computer, a CPU (Central Processing Unit) 201, a ROM (Read Only Memory) 202, and a RAM (Random Access Memory) 203 are connected to one another by a bus 204.

Further, an input/output interface 205 is connected to the bus 204. An inputting section 206, an outputting section 207, a storage section 208, a communication section 209, and a drive 210 are connected to the input/output interface 205.

The inputting section 206 includes, for example, a keyboard, a mouse, a microphone, a touch panel, an input terminal, and so forth. The outputting section 207 includes a display, a speaker, an output terminal, and so forth. The storage section 208 includes, for example, a hard disk, a RAM disk, a nonvolatile memory, or the like. The communication section 209 includes, for example, a network interface. The drive 210 drives a removable recording medium 211 such as a magnetic disk, an optical disk, a magneto-optical disk, or a semiconductor memory.

In the computer configured in such a manner as described above, the CPU 201 loads a program stored, for example, in the storage section 208 into the RAM 203 through the input/output interface 205 and the bus 204 and executes the program to perform the series of processes described above. Into the RAM 203, also data and so forth necessary for the CPU 201 to execute various processes are stored suitably.

In the computer, the program can be installed into the storage section 208 through the input/output interface 205 by mounting the removable recording medium 211 on the drive 210. Further, the program can be received by the communication section 209 through a wired or wireless transmission medium such as a local area network, the Internet, or a digital satellite broadcast and installed into the storage section 208. Alternatively, the program can be installed in advance into the ROM 202 or the storage section 208.

It is to be noted that the program executed by the computer may be a program by which processing is performed in a time series along the order described in the present specification or may be a program by which processing is performed in parallel or at a necessary timing such as when the program is called.

In the present specification, the system is used to signify an aggregation of a plurality of components (devices, modules (parts), and so forth), and it does not matter whether or not all components are accommodated in the same housing. Accordingly, a plurality of apparatuses accommodated in separate housings and connected to each other through a network and one apparatus in which a plurality of modules is accommodated in a single housing are each a system.

The embodiment of the present technology is not limited to the embodiment described hereinabove and allows various alterations without departing from the subject matter of the present technology.

For example, a form in which portions of the embodiment described above are optionally combined can be adopted.

For example, the present technology can take a configuration for cloud computing by which one function is shared and cooperatively processed by a plurality of apparatuses through a network.

Further, each of the steps described hereinabove in connection with the flow charts not only can be executed by a single apparatus but also can be shared and executed by a plurality of apparatuses.

Furthermore, in a case where a plurality of processes is included in one step, the plurality of processes included in the one step not only can be executed by one apparatus but also can be shared and executed by a plurality of apparatuses.

In the present specification, the steps described in the flow charts may not only be performed in a time series along the order described but also may be executed, even if they are not processed in a time series, in parallel or at a necessary timing such as when they are called.

It is to be noted that the effects described in the present specification are merely an example and not restrictive, and other effects than those described in the present specification may be applicable.

It is to be noted that the present technology can also take configurations as described below.

(1)

A wireless communication apparatus including:

a communication section configured to generate and transmit an OFDM signal in which second information is superimposed in a frequency axis direction of the OFDM signal which includes first information destined for one or more subordinate client devices.

(2)

The wireless communication apparatus according to (1) above, in which the communication section changes a power level and a modulation encoding method for part of subcarriers of the OFDM signal including the first information on the basis of the second information.

(3)

The wireless communication apparatus according to (2) above, in which the communication section determines a subcarrier for which the power level and the modulation encoding method are to be changed on the basis of the second information.

(4)

The wireless communication apparatus according to any one of (1) to (3) above, in which the communication section generates and transmits an OFDM signal in which second information is superimposed in a frequency axis direction of the OFDM signal that includes first information destined for a plurality of the subordinate client devices.

(5)

The wireless communication apparatus according to (4) above, in which the communication section performs subcarrier interleave for interleaving a subcarrier of the OFDM signal.

(6)

The wireless communication apparatus according to (5) above, in which the communication section determines a method of the subcarrier interleave on the basis of at least one of the second information or information regarding the plurality of the client devices each of which is a destination.

(7)

The wireless communication apparatus according to (5) or (6) above, in which the communication section stores information relating to a method of the subcarrier interleave in a physical header of the OFDM signal.

(8)

The wireless communication apparatus according to any one of (1) to (7) above, in which the communication section stores information relating to a modulation encoding method for a subcarrier in a physical header of the OFDM signal.

(9)

The wireless communication apparatus according to any one of (1) to (8) above, in which the second information includes information relating to an identifier of the own apparatus, information for performing spatial reuse by another wireless communication apparatus, or information for performing cooperative operation between base stations.

(10)

A wireless communication method performed by a wireless communication apparatus, including:

generating and transmitting an OFDM signal in which second information is superimposed in a frequency axis direction of the OFDM signal which includes first information destined for one or more subordinate client devices.

(11)

A communication apparatus including:

a communication section configured to receive an OFDM signal which is transmitted from a base station to which the own apparatus is connected and in which second information is superimposed in a frequency axis direction of the OFDM signal which includes first information destined for the own apparatus to acquire the first information.

(12)

The wireless communication apparatus according to (11) above, in which the communication section performs, on the basis of information stored in a physical header of the OFDM signal and relating to a modulation encoding method of a subcarrier, demodulation and decoding of the subcarrier.

(13)

The wireless communication apparatus according to (11) or (12) above, in which the communication section performs subcarrier deinterleave of deinterleaving a subcarrier of the OFDM signal on the basis of information stored in a physical header of the OFDM signal and relating to a method for subcarrier interleave.

(14)

A wireless communication method performed by a wireless communication apparatus, including:

receiving an OFDM signal which is transmitted from a base station to which the own apparatus is connected and in which second information is superimposed in a frequency axis direction of the OFDM signal which includes first information destined for the own apparatus to acquire the first information.

(15)

A wireless communication apparatus including:

a communication section configured to receive an OFDM signal which is transmitted from a base station of a BSS different from that of the own apparatus and in which second information is superimposed in a frequency axis direction of the OFDM signal which includes first information to acquire the second information.

(16)

The wireless communication apparatus according to (15) above, in which the communication section detects periodicity of the OFDM signal and performs frequency synchronization.

(17)

The wireless communication apparatus according to (15) or (16) above, in which the communication section detects a power level of a subcarrier of the OFDM signal to acquire the second information.

(18)

The wireless communication apparatus according to any one of (15) to (17) above, in which the second information includes information for performing spatial reuse.

(19)

The wireless communication apparatus according to any one of (15) to (17) above, in which the second information includes information for performing cooperative operation between base stations.

(20)

A wireless communication method performed by a wireless communication apparatus, including:

receiving an OFDM signal which is transmitted from a base station of a BSS different from that of the own apparatus and in which second information is superimposed in a frequency axis direction of the OFDM signal which includes first information to acquire the second information.

REFERENCE SIGNS LIST

AP (AP1, AP2) Base station, STA (STA1 to STA3, STA11) Client device, 10 Wireless communication apparatus, 22 Control section, 23 Communication section, 31 Modulation and demodulation section, 32 Space signal processing section, 34 Wireless interface section, 51 Frequency direction information superimposition section, 52 Encoding section, 53 Bit interleave section, 54 Modulation/signal space mapping section, 71 Frequency direction information superimposition section, 72 Subcarrier interleave section, 104 NEW-SIG information acquisition section, 105 Demodulation/signal space demapping section, 106 Bit deinterleave section, 107 Decoding section, 121 NEW-SIG information acquisition section, 122 Subcarrier deinterleave section, 142 Simple frequency synchronization section, 145 Superimposition data acquisition section, 201 CPU, 202 ROM, 203 RAM, 206 Inputting section, 207 Outputting section, 208 Storage section, 209 Communication section, 210 Drive

The invention claimed is:

1. A wireless communication apparatus, comprising:

a communication interface configured to:

generate and transmit an Orthogonal Frequency Division Multiplexing (OFDM) signal that includes first information destined for at least one subordinate client device, and second information that includes information for spatial reuse, wherein the second information is superimposed in a frequency axis direction of the OFDM signal; and change a power level and a modulation encoding method for a set of subcarriers of the OFDM signal based on the second information.

2. The wireless communication apparatus according to claim 1, wherein the communication interface is further configured to determine, based on the second information, a subcarrier of the set of subcarriers for which the power level and the modulation encoding method are to be changed.

3. The wireless communication apparatus according to claim 1, wherein
the communication interface is further configured to generate and transmit the OFDM signal that includes the first information destined for a plurality of subordinate client devices, and
the plurality of subordinate client devices includes the at least one subordinate client device.

4. The wireless communication apparatus according to claim 3, wherein the communication interface is further configured to perform subcarrier interleave to interleave a subcarrier of the set of subcarriers of the OFDM signal.

5. The wireless communication apparatus according to claim 4, wherein
the communication interface is further configured to determine a method of the subcarrier interleave based on at least one of the second information or information associated with the plurality of subordinate client devices, and
each of the plurality of subordinate client devices is a destination.

6. The wireless communication apparatus according to claim 4, wherein the communication interface is further configured to store information associated with a method of the subcarrier interleave in a physical header of the OFDM signal.

7. The wireless communication apparatus according to claim 1, wherein the communication interface is further configured to store, in a physical header of the OFDM signal, information associated with the modulation encoding method for a subcarrier of the set of subcarriers of the OFDM signal.

8. The wireless communication apparatus according to claim 1, wherein the second information further includes at least one of information associated with an identifier of the wireless communication apparatus or information to perform cooperative operation between a plurality of base stations.

9. A wireless communication method, comprising:
in a wireless communication apparatus:
generating and transmitting, by a communication interface of the wireless communication apparatus, an Orthogonal Frequency Division Multiplexing (OFDM) signal that includes
first information destined for at least one subordinate client device, and
second information that includes information for spatial reuse,
wherein the second information is superimposed in a frequency axis direction of the OFDM signal; and
changing a power level and a modulation encoding method for a set of subcarriers of the OFDM signal based on the second information.

10. A wireless communication apparatus, comprising:
a communication interface configured to:
receive an Orthogonal Frequency Division Multiplexing (OFDM) signal transmitted from a base station to which the wireless communication apparatus is connected, wherein
the OFDM signal includes
first information destined for the wireless communication apparatus, and
second information that includes information for spatial reuse,
the second information is superimposed in a frequency axis direction of the OFDM signal, and
change of a power level and a modulation encoding method for a set of subcarriers of the OFDM signal is based on the second information; and
acquire the first information based on the received OFDM signal.

11. The wireless communication apparatus according to claim 10, wherein the communication interface is further configured to perform, based on information stored in a physical header of the OFDM signal and information associated with the modulation encoding method of a subcarrier of the set of subcarriers of the OFDM signal, demodulation and decoding of the subcarrier of the OFDM signal.

12. The wireless communication apparatus according to claim 10, wherein the communication interface is further configured to perform, based on information stored in a physical header of the OFDM signal and information associated with a method of subcarrier interleave, subcarrier deinterleave of deinterleaving a subcarrier of the set of subcarriers of the OFDM signal.

13. A wireless communication method, comprising:
in a wireless communication apparatus:
receiving, by a communication interface of the wireless communication apparatus, an Orthogonal Frequency Division Multiplexing (OFDM) signal transmitted from a base station to which the wireless communication apparatus is connected, wherein
the OFDM signal includes
first information destined for the wireless communication apparatus, and
second information that includes information for spatial reuse,
the second information is superimposed in a frequency axis direction of the OFDM signal, and
change of a power level and a modulation encoding method for a set of subcarriers of the OFDM signal is based on the second information; and
acquiring the first information based on the received OFDM signal.

14. A wireless communication apparatus, comprising:
a communication interface configured to:
receive an Orthogonal Frequency Division Multiplexing (OFDM) signal transmitted from a base station of a first basic service set (BSS), wherein
the first BSS is different from a second BSS of the wireless communication apparatus,
the OFDM signal includes
first information, and
second information that includes information for spatial reuse,
the second information is superimposed in a frequency axis direction of the OFDM signal, and
change of a power level and a modulation encoding method for a set of subcarriers of the OFDM signal is based on the second information; and
acquire the second information based on the received OFDM signal.

15. The wireless communication apparatus according to claim 14, wherein the communication interface is further configured to:
  detect a periodicity of the OFDM signal; and
  perform frequency synchronization.

16. The wireless communication apparatus according to claim 14, wherein the communication interface is further configured to detect the power level of a subcarrier of the set of subcarriers of the OFDM signal to acquire the second information.

17. The wireless communication apparatus according to claim 14, wherein the second information further includes information to perform cooperative operation between a plurality of base stations.

18. A wireless communication method, comprising:
  in a wireless communication apparatus:
    receiving, by a communication interface of the wireless communication apparatus, an Orthogonal Frequency Division Multiplexing (OFDM) signal transmitted from a base station of a first basic service set (BSS), wherein
      the first BSS is different from a second BSS of the wireless communication apparatus,
      the OFDM signal includes
        first information, and
        second information that includes information for spatial reuse,
      the second information is superimposed in a frequency axis direction of the OFDM signal, and
      change of a power level and a modulation encoding method for a set of subcarriers of the OFDM signal is based on the second information; and
    acquiring the second information based on the received OFDM signal.

* * * * *